United States Patent [19]
Natelson

[11] 3,802,782
[45] Apr. 9, 1974

[54] CHEMICAL ANALYZER PERFORMING SEQUENTIAL ANALYSIS OF SAMPLES

[75] Inventor: Samuel Natelson, Chicago, Ill.

[73] Assignee: Rohe Scientific Corporation, Santa Ana, Calif.

[22] Filed: June 24, 1971

[21] Appl. No.: 156,285

Related U.S. Application Data

[63] Continuation-in-part of Ser. No. 845,992, Aug. 19, 1970, Pat. No. 3,722,790, Continuation-in-part of Ser. No. 874,824, Nov. 7, 1969, Pat. No. 3,635,394, Continuation-in-part of Ser. No. 95,305, Dec. 4, 1970, Pat. No. 3,687,632.

[52] U.S. Cl. ............... 356/180, 23/253 R, 23/259, 73/421 B, 73/425.6, 137/625.11, 250/218, 356/85
[51] Int. Cl. ...................... G01j 3/50, G01n 21/26
[58] Field of Search ............. 23/253 R, 253 A, 259; 73/421, 425.2, 425.4 R, 425.6; 356/181, 206; 137/625.11; 250/218

[56] References Cited
UNITED STATES PATENTS

| | | | |
|---|---|---|---|
| 3,484,170 | 12/1969 | Smythe et al. | 356/181 |
| 3,570,314 | 3/1971 | Wagner | 23/253 R X |
| 3,578,412 | 5/1971 | Martin | 23/259 |

Primary Examiner—Ronald L. Wibert
Assistant Examiner—F. L. Evans
Attorney, Agent, or Firm—George B. Oujevolk

[57] ABSTRACT

An instrument to efficiently assay the contents of different liquid mixtures held in containers which are disposed in rows in a rack. A plurality of probes dip simultaneously into the containers held in a single row. By means of a sequencing valve, called a distributor, the probes are connected sequentially to an aspirator. The aspirator causes the contents of each container to flow, in sequence through a readout area, thus sensing the components in each solution. The probes move down only once for each row, regardless of how many containers are held in the row. The readout area comprises a monochromator, flow through cuvet and detector, including sensing and printout means. The monochromator is adjusted with the distributor in a synchronous fashion so that each solution may be examined at a different wavelength. Alternately, the solutions may be sprayed into a plasma jet for assay of its element content. Means for taking aliquots from a diluted specimen to be distributed to the different containers in the row is also described, as well as means for bringing the containers to the probes for aspiration.

14 Claims, 21 Drawing Figures

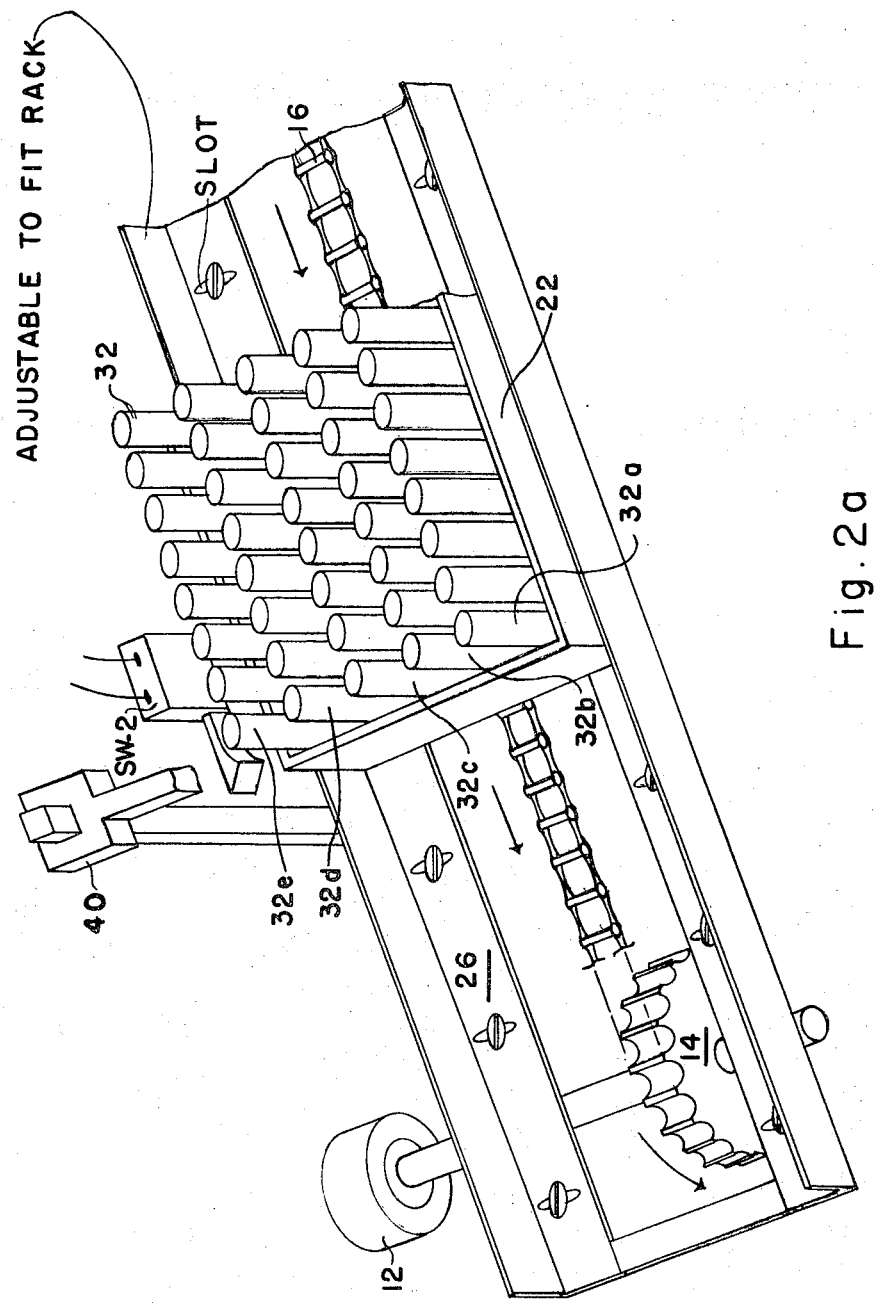

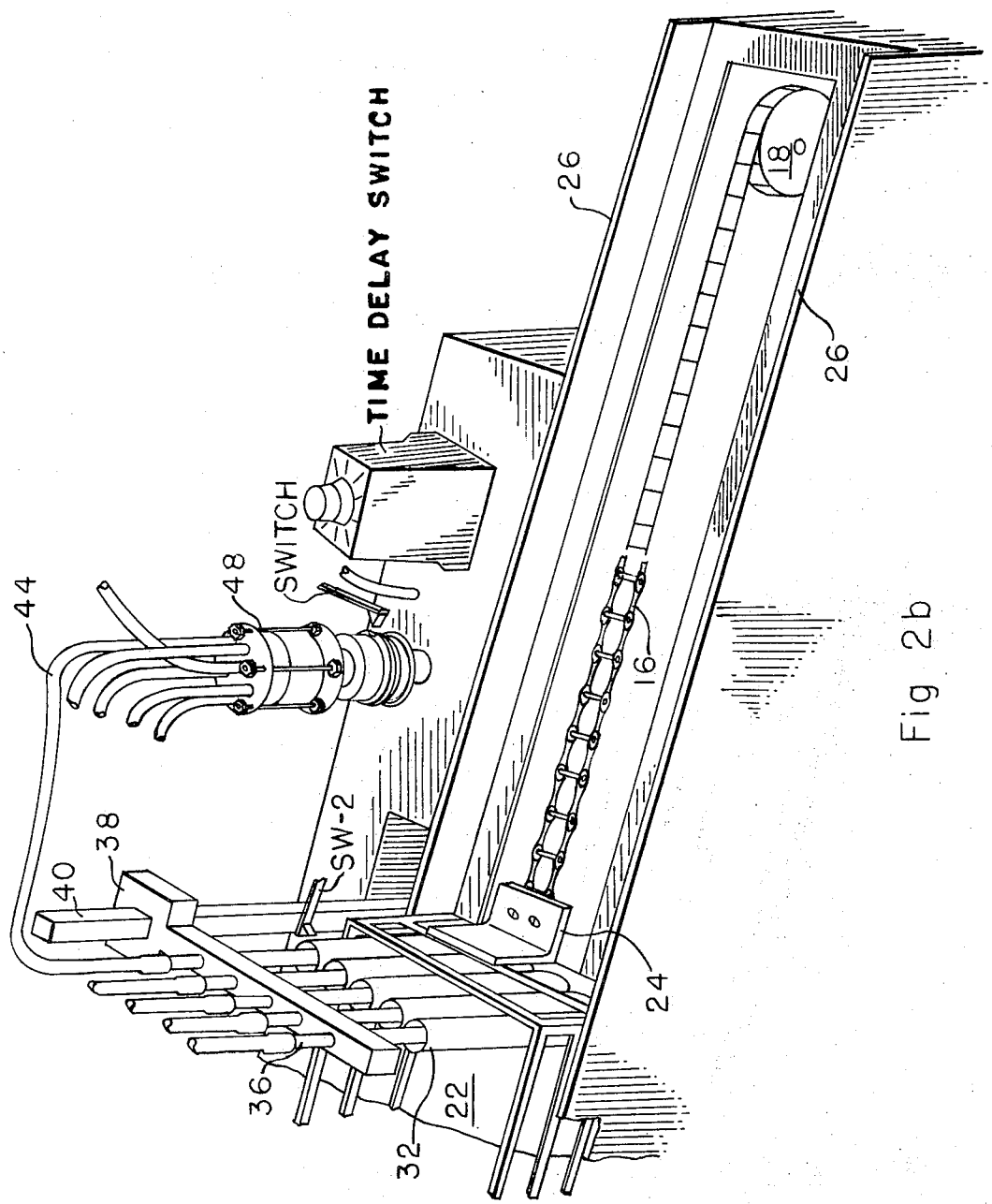

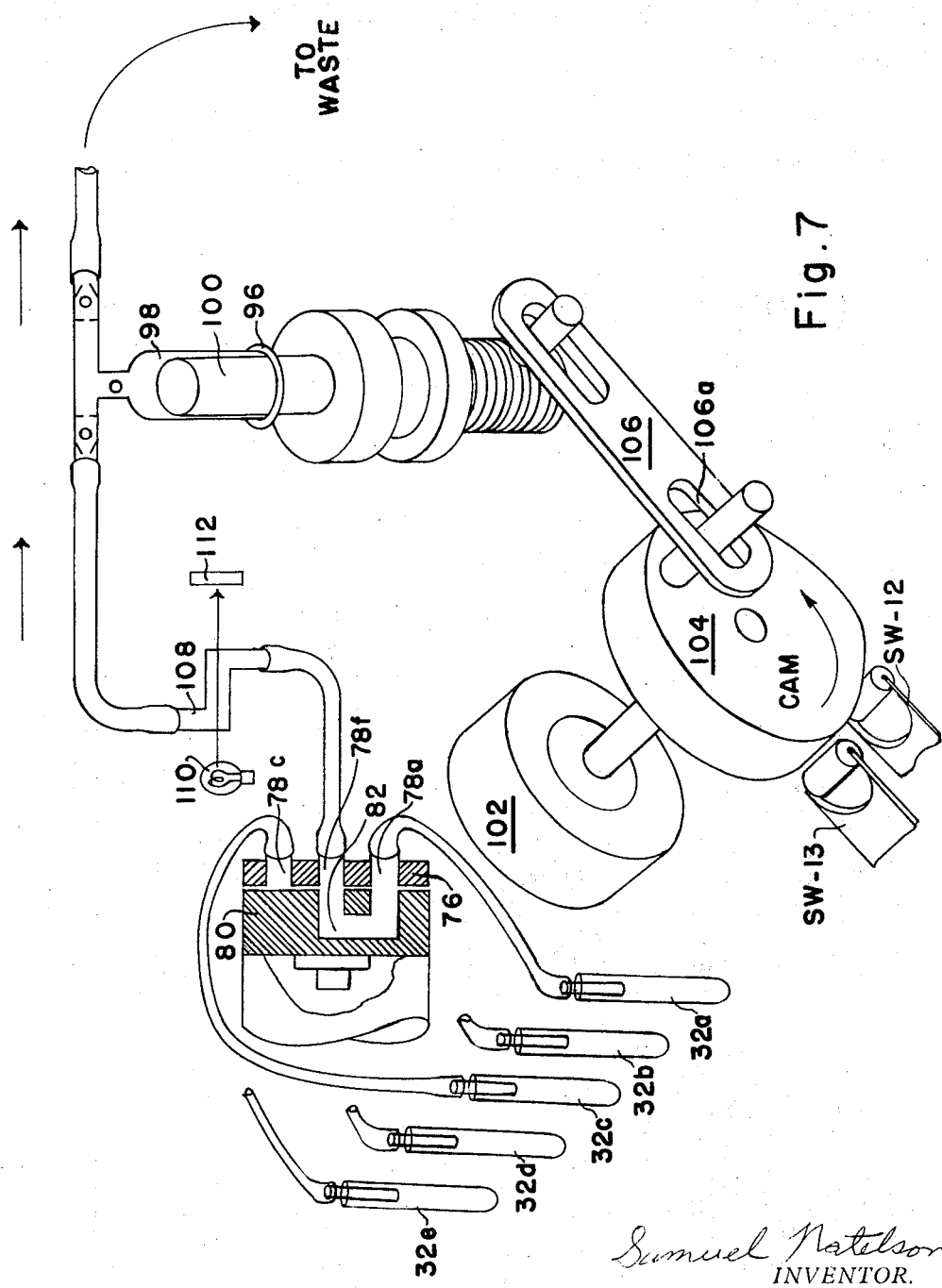

CHEMICAL ANALYZER PERFORMING SEQUENTIAL ANALYSIS OF SAMPLES

BACKGROUND OF THE INVENTION

The present application is a continuation-in-part of U. S. Pat. application No. 845,992 filed Aug. 19, 1970, now U.S. Pat. No. 3,722,790, No. 874,824 filed Nov. 7, 1969, now U.S. Pat. No. 3,635,394 and No. 95,305 filed Dec. 4, 1970, now U.S. Pat. No. 3,687,632.

BRIEF DESCRIPTION OF THE PRIOR ART

In the aforementioned parent applications, a totally automated chemical laboratory was described. The present invention is directed to a readout arrangement for an automated chemical laboratory and more particularly to a readout arrangement wherein a plurality of sample containers simultaneously arrive at a readout station and it is necessary to then properly process these samples in a colorimeter type readout mechanism.

Although in the conventional automatic systems for analysis of the prior art, specimens move to the readout stage sequentially for a readout, in one system, (Natelson U. S. Pat. application Ser. No. 95,305) of which this application is a continuation-in-part, the samples contained in test tubes move in parallel rows as in a test tube rack. The test tubes are then depressed and the colors read out through the test tubes. This system, while effective, has the disadvantage that it requires a high grade of test tubes which are equally pervious to the light. Commercially available test tubes, either glass or plastic are cheaply made, and are not intended for use at a readout station. As a result, etching and scratches on the test tubes or variation in bore or wall thickness, add to an overall error in the measurement.

FEATURES OF THE PRESENT INVENTION

In the present system of this invention, advantage is taken of the movement, in parallel rows, of containers, as in test tube racks. However, the solution is transferred sequentially from the test tubes to a central readout system so that the light path remains constant. In addition, the rack advances by rows. The specimens in each row are read and then the rack again moves forward to present the next row for reading.

The particular instrument with which the present patent application is concerned is the readout station and the means by which it is coupled to the transfer station described in U. S. Pat. application Ser. No. 95,305. For this purpose, samples picked up by a sampler-diluter at the transfer station, from the first rack are transposed to a cup. From this cup, a plurality of samples can be taken. Thus, a single sample is split into a plurality of samples. In Pat. application Ser. No. 95,305, the samples are picked up, diluted, and transferred to a second test tube contained in a rack. Both sample rack and receiving rack move synchronously. For the purpose of the present invention, the second rack is replaced by a container with a multiplicity of outlets (see FIG. 1a). This has the advantage that many analyses can be done on one serum sample.

An important feature of the present invention is the use of a distributor to sample from each test tube in a row sequentially through one colorimeter or spectrophotometer. At the same time the monochromatic light through the sample to be read, changes in synchronization with the rotation of the distributor so that each solution in a row may have a different color and still be read out. The use of the distributor saves substantial time in that in place of a probe dipping into each of several test tubes held in a row, the dipping mechanism dips only once and then samples from each tube as the distributor cycles.

SUMMARY OF THE INVENTION

Generally speaking, the present invention contemplates a processing arrangement in a system of chemical analysis wherein parallel rows of sample containers are stopped at a specimen readout station, with said containers occupying at least two lateral defined spaces. At this readout station, a plurality of probes are disposed for vertical movement above the station. The lower ends of these probes enter the containers on the downward movement of the probes. Connecting lines connect each of said probes to a distributor having a central outlet. In the distributor are sequential connecting means sequentially connecting each of said lines to said central outlet while readout means are connected to said central outlet. Sample is pumped from the probes to the readout means through the distributor by pump means, and power means sequentially present the containers to the readout station, raise and lower the probes at the station, operate the sequential connecting means in the distributor and operate the pump means.

The invention, as well as other objects and advantages thereof will be more readily apparent from the following detailed description when taken in connection with the accompanying drawing in which:

FIG. 1a presents a schematic side explanation of the apparatus contemplated herein;

FIG. 1d is a perspective and schematic explanation of a work station previous to the apparatus shown in FIG. 1a;

FIG. 1e illustrates a modified drive arrangement to that shown in FIG. 1a;

FIG. 2a shows a perspective view of a portion of the readout station contemplated herein;

FIG. 2b illustrates another perspective view of the readout station contemplated herein;

FIG. 7 shows a perspective explanation of the apparatus described in FIG. 3;

OVERALL OPERATION

Figure 1A:
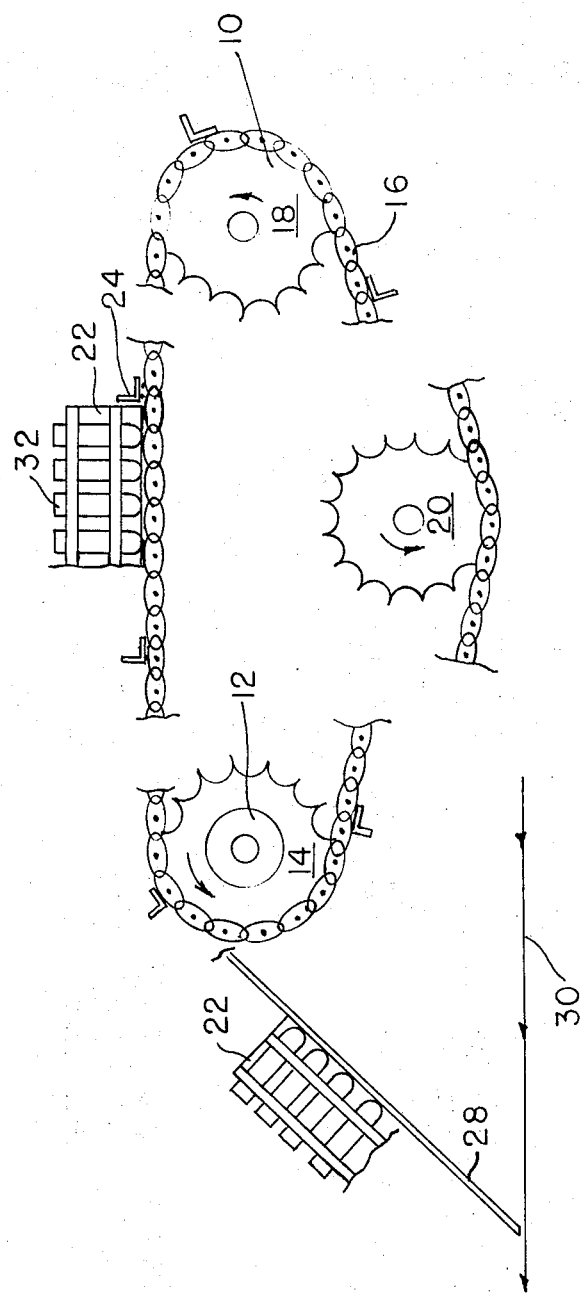
Figure 1B:
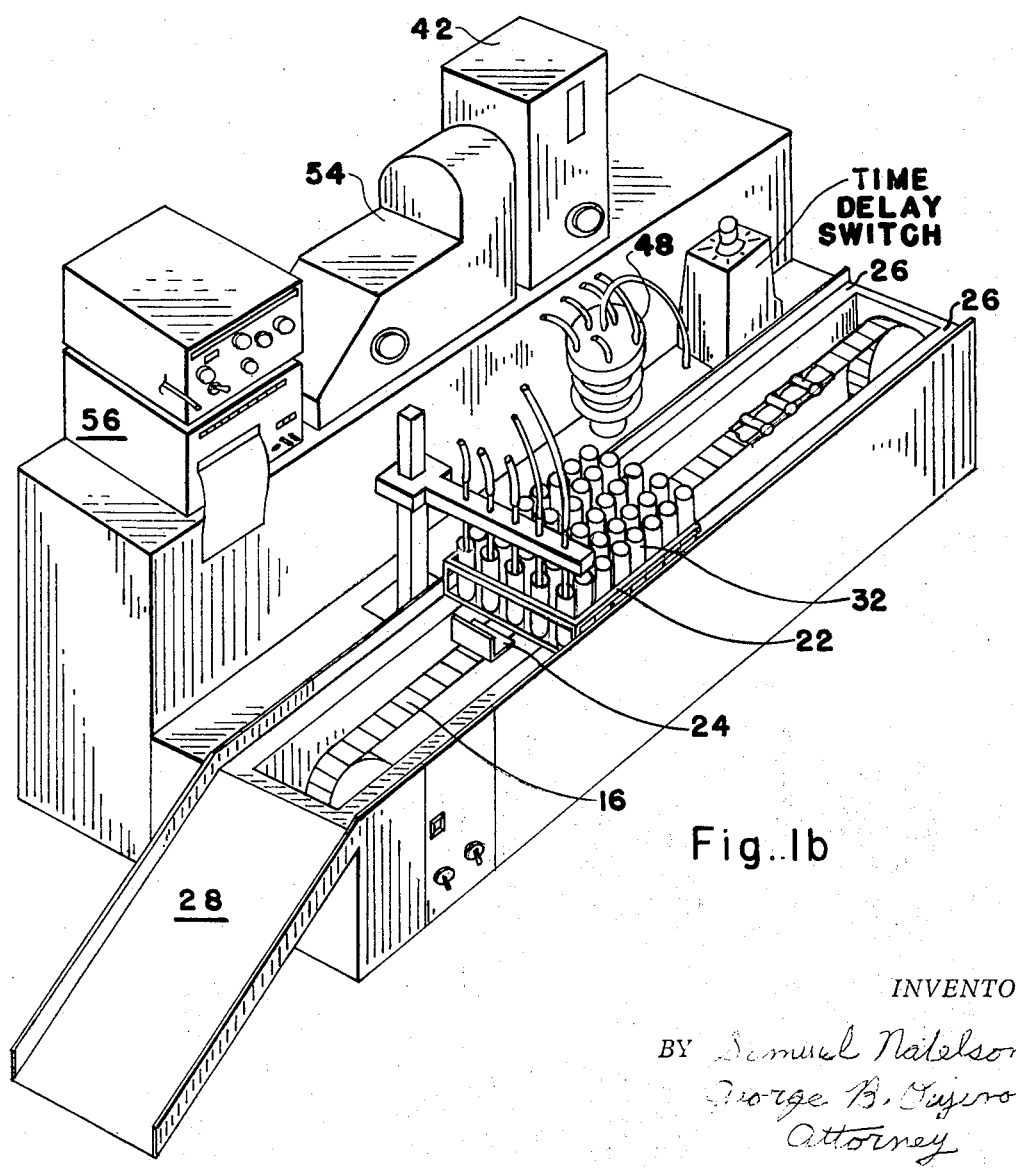
FIG. 1b is a perspective end view of the apparatus contemplated herein.
Figure 1C:
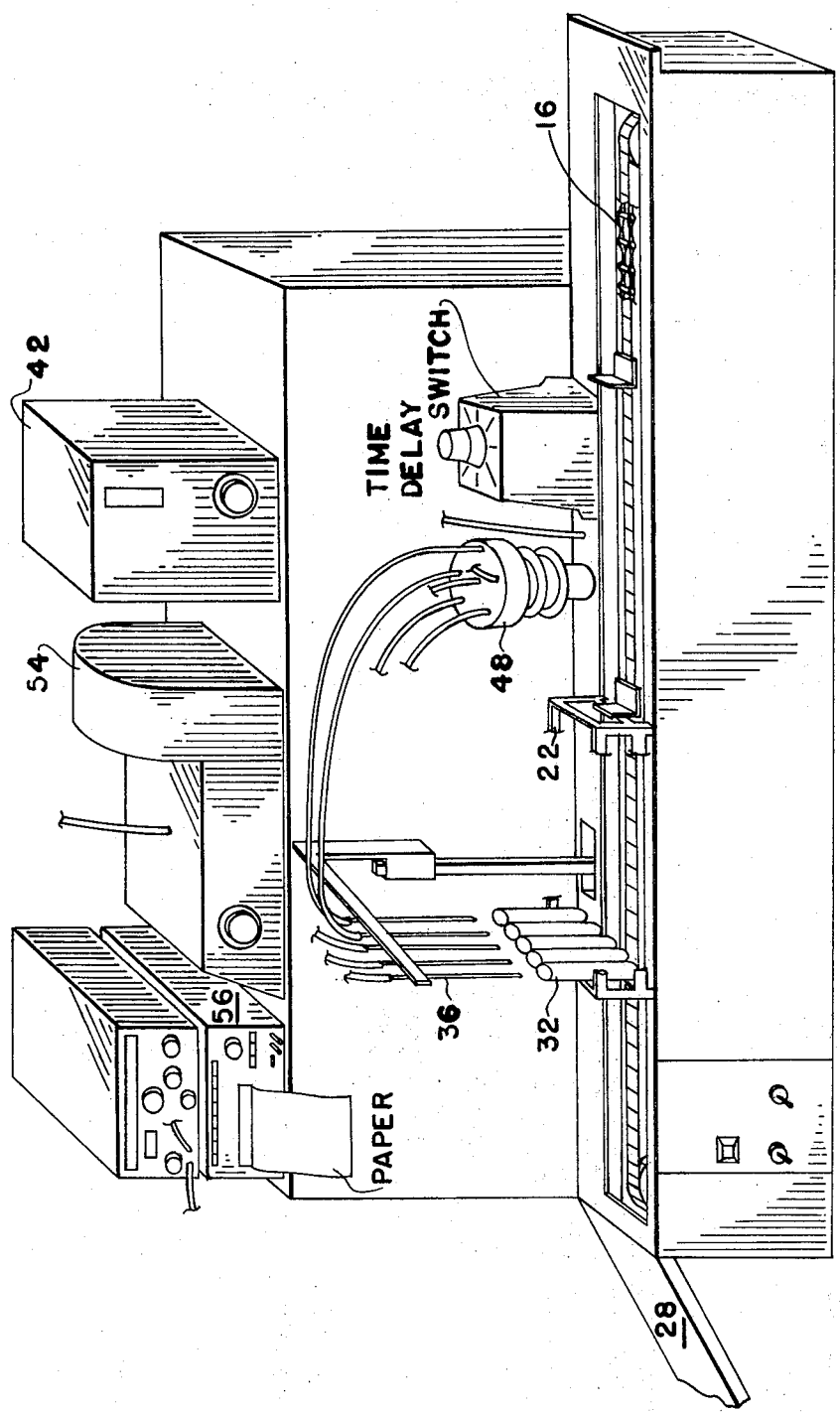
FIG. 1c is a perspective side view of the apparatus contemplated herein.

The portion of the instrument 10 which is used herein to transport the samples from the transfer machine described in U. S. Pat. application Ser. No. 95,305, to the readout station, is depicted in FIGS. 1a, 1b, 1c, and 2a. FIG. 1a is a side view of the instrument to indicate more clearly the complete drive. A track motor 12 drives a drive sprocket 14 disposed on a shaft. This pulls a continuous chain 16 which is looped over a carrier sprocket 18 and an idler sprocket 20. The idler sprocket's position is adjustable so as to tighten the chain after assembly. Test tube rack 22 is pushed by a piece of angle iron mounted on a chain called the pusher 24. This slides the racks along the Teflon lined angle iron track 26 shown in FIG. 2a. When the rack comes to the end of its travel, it extends until its center of gravity moves beyond the chain. It then falls over on a Teflon lined angle iron slide ramp 28 to fall to a leather belt drive 30 where it is carried away for further processing, to waste or recovery.

Figure 1D:
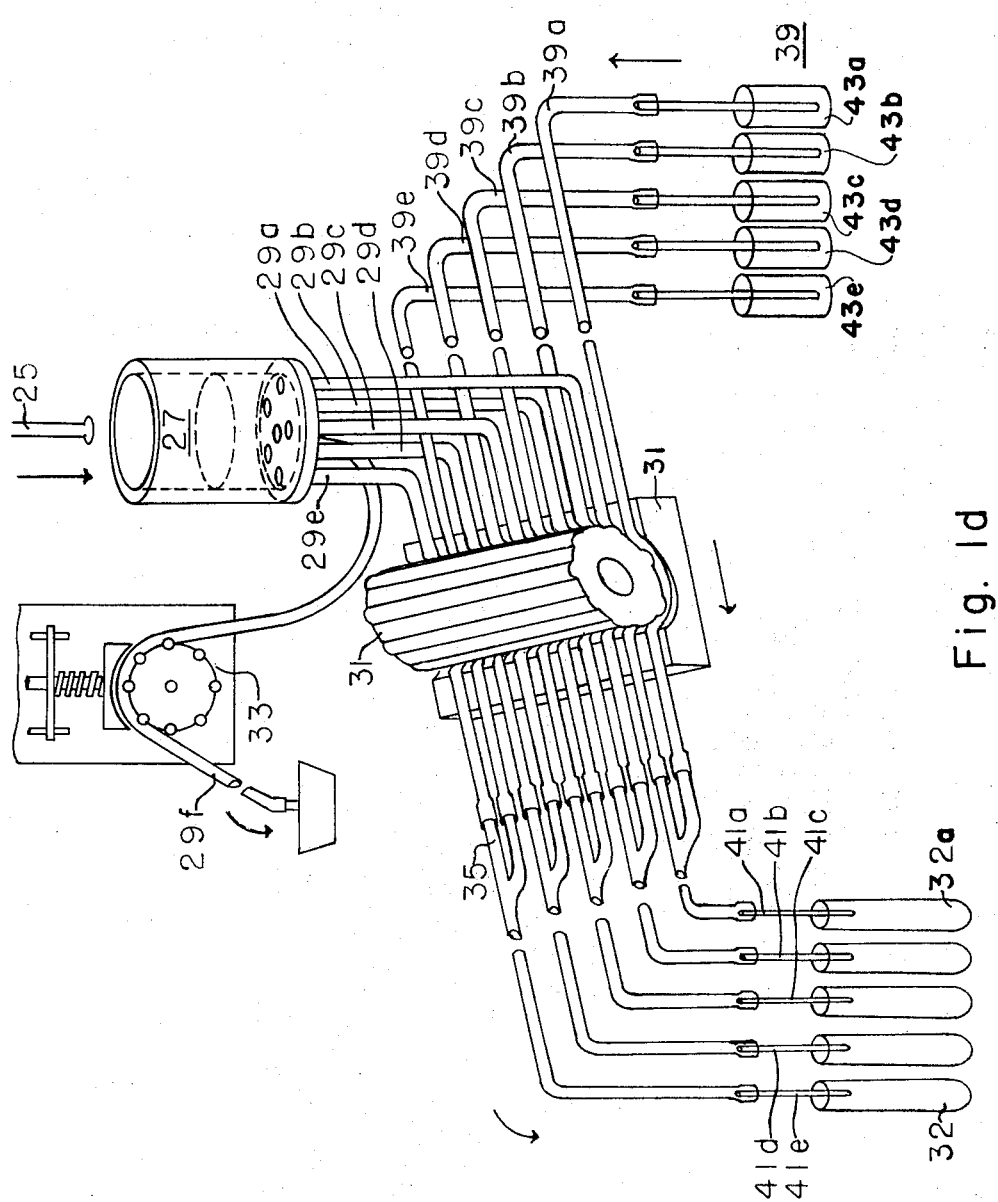

Before arriving at the readout station, the test tubes 32 in test tube rack 22 must be filled with samples. This is shown in FIG. 1d. Sample from the transfer machine, e.g., such as is described in U. S. Pat. application, Ser. No. 95,305 is represented as an outlet 25. This is ejected into a mixing container 27 having six outlets in the example shown, 29a, 29b, 29c, 29d, 29e, 29f, connected to rubber or plastic tubing. Five pieces of tubing 29a through 29e are acted on by a peristaltic pump 31. The sixth piece of tubing 29f goes to a separate peristaltic pump 33 and serves to drain off excess sample and thus permit more accurate fractioning. Also at this work station are five reagent containers 43a to 43e. The five pieces of tubing 29a through 29e go to Y-connectors 35 and at the same time a corresponding number of reagent tubes 39a to 39e go from a reagent station 39 where the reagent containers 43a to 43e are located, to the Y-tube connectors 35 joining each reagent tube to a sampling tube. The peristaltic pump 31 acts both on the sample containing tubes 29a through 29e and the reagent tubes 39a through 39e. The Y-connecting tubes are in turn each connected to outlet elements 41a, 41b, 41c, 41d, 41e, which can be raised or lowered into test tube containers 32, 32a, etc., by a lifting mechanism. Thus, a measured amount of reagent is mixed with sample by the action of peristaltic pump 31, on the plastic tubing which pumps both sample from cup 27, and reagent from the reagent station 39 and mixes them at Y-tubes 35. The mixture of the reagent and the sample passes to test tubes 32, through the Y-connectors. The sample is then carried to the readout station.

The portion of the instrument at the readout station is better shown in FIGS. 2a and 2b. The test tubes 32 are contained in a test tube rack 22 moving five abreast 32a . . . . . 32e. In actual practice, four to eight abreast are practicable. The test tube rack in FIGS. 2a and 2b shows five rows for simplicity. A practical design is a rack with 16 rows, five abreast. A total of 80 test tubes are thus kept in a compact arrangement as they are loaded from the transfer machine which is the subject of the aforesaid Natelson Pat. application Ser. No. 95,305.

As previously mentioned, a motor drives a sprocket which pulls the chain mounted between the two sprockets, while the third idler sprocket maintains the chain rigid. Mounted on the chain is a piece of angle iron which serves as a pusher 24, to push the rack along.

The rack rests on tracks 26 made of Teflon coated angle iron so that the movement will be smooth. The distance between the two tracks is adjustable to fit various rack sizes. As the motor turns, the rack moves forward. When the test tube 32e of the first row intercepts a switch, the rack stops.

In FIGS. 2a and 2b the rack moves to a test tube switch located in alignment with a set of probes, which are part of a readout station which is discussed below.

This presupposes that reagents are mixed, react instantly to produce a color or are merely diluted to be aspirated into a flame photometer or plasma jet assembly as discussed below.

In many cases this is not so since some processing needs to take place before the racks move to the readout station.

Figure 1E:
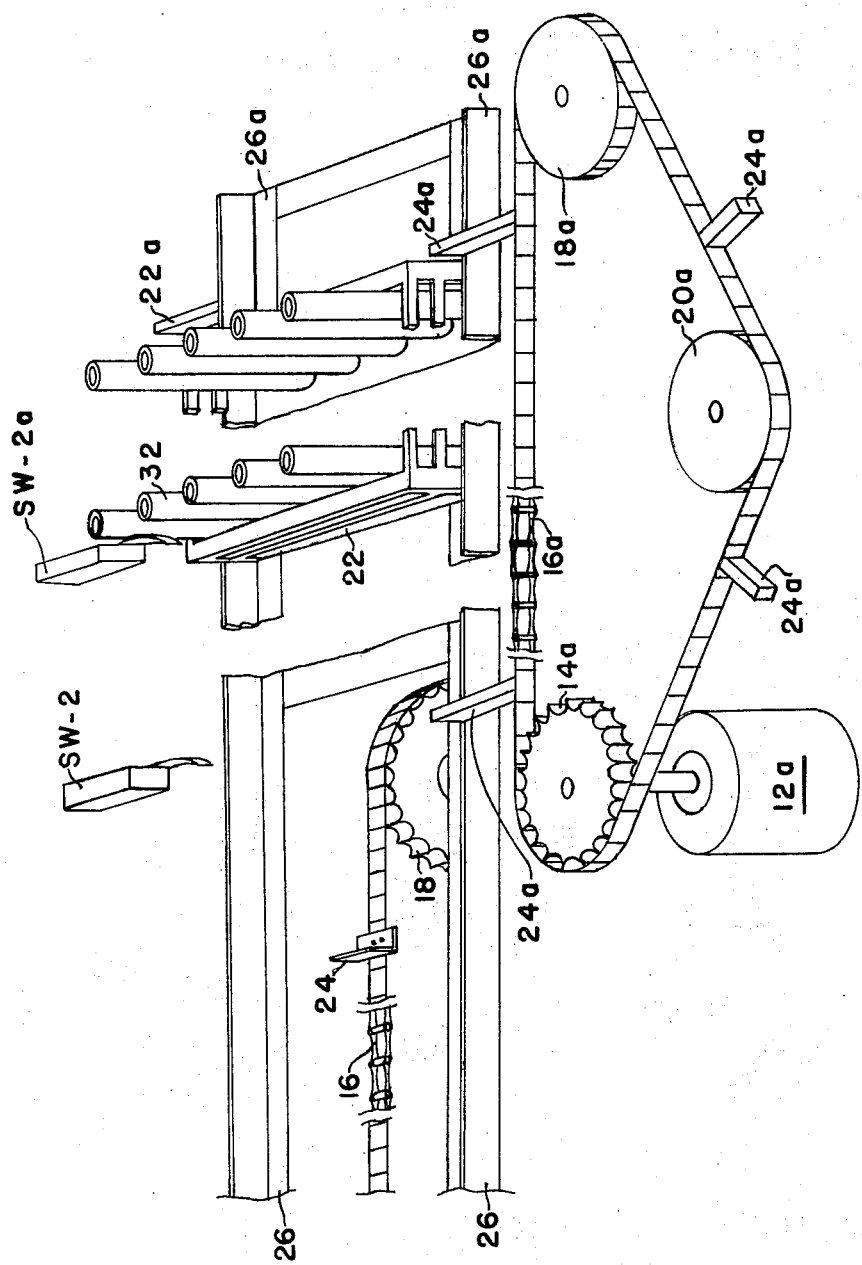

In this case a second arrangement, similar to that of FIG. 1a is aligned to tandem behind that of the instrument of FIG. 1a. This is shown in FIG. 1e. In FIG. 1e, it is to be noted that the first driving mechanism pushes the racks from the side instead of the bottom. This is done by having a drive sprocket 14a, carrier sprocket 18a, and idler sprocket 20a, perpendicular to the disposition shown in FIG. 1a and perpendicular to the test tubes 32. The racks sit in a slide 26a. As the chain 16a moves, horizontal projections (pushers) slide the rack along until it comes to a test tube switch SW-2a. This stops the rack. The arrangement in FIG. 1e permits construction of a slide with sides to hold water at constant temperature. In this case the rack slides while partially submerged.

The sample and reagents are poured in as shown in FIG. 1d. Additional reagents are added if necessary, and the rack advances to the next row of test tubes. This is repeated until all the rows have been filled. The rack now may pass a heating and cooling zone if necessary. The rack continues to advance.

Since the first driving mechanism overlaps the second driving mechanism, the rack now is transferred to the tracks of the second driving mechansim. It now comes under control of the second driving mechanism. This is done in the following manner. A metal projection 22a, extends out from the rack 22. This is below switch SW-2a and misses it. After the rack has been transferred to the second driving mechanism by the pusher 24a, the rear of the rack comes in contact with switch SW-2b. This starts the second driving mechanism by overriding a stop switch. The rack is now under control of the second driving mechanism and is brought to the reading station where it is stopped by switch SW-2. The contents of the tubes can now be read out as described below.

READOUT STATION

Figure 3:
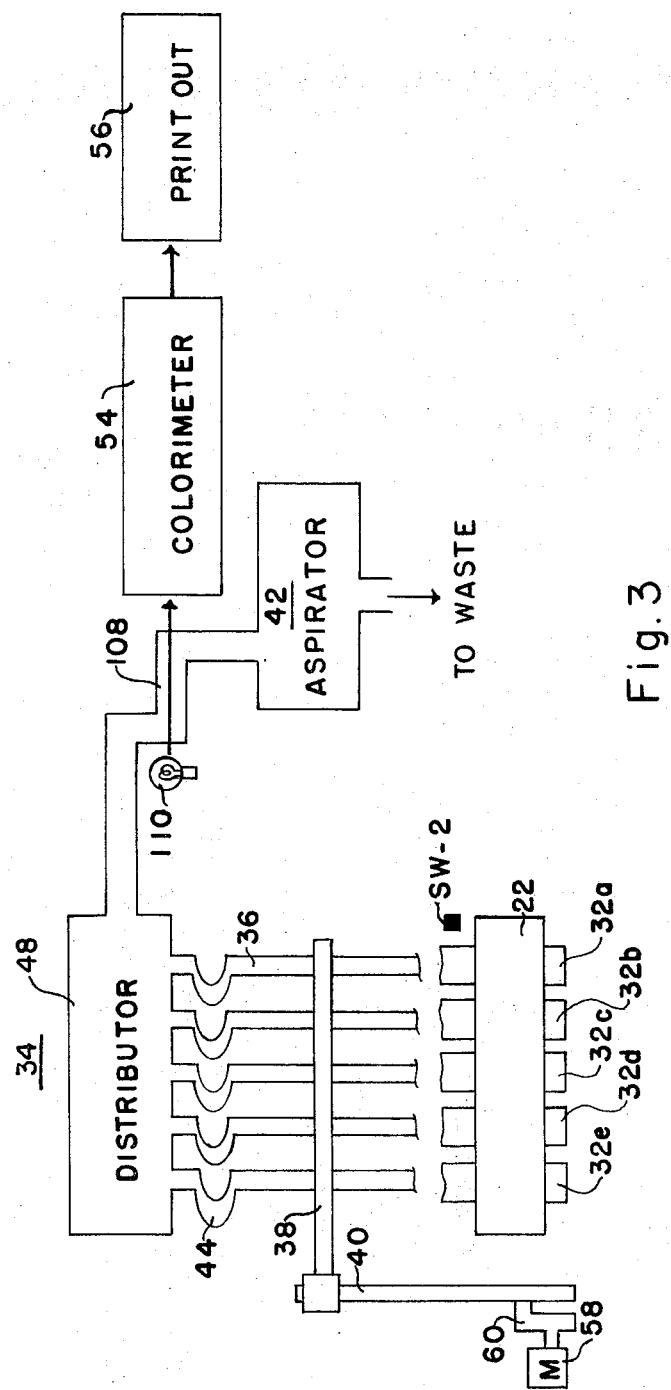
FIG. 3 is a schematic explanation of part of the inventive concept.

The situation at the readout station is explained schematically in FIG. 2b and in FIG. 3, showing five test tubes 32a through 32d which are abreast at a readout station 34. A contact switch SW-2 at said station will stop the track travel when activated by a test tube. Disposed above the five test tubes shown are five probes 36 held by a slide 38, mounted for vertical up and down movement on a post 40. The probes 36 are each tied to a combination mechanism by flexible tubing 44 and are more fully described later. This combination mechanism includes an aspirator 42 to aspirate up sample specimens in the test tubes through a distributor 48 which is a sequential valve. Only one sample at a time will pass the distributor 48. The aspirator piston 100, in FIG. 7, is a motor activated syringe and valve assembly. The aspirator will aspirate the sample through a flow through cuvet 108 having a light 110 on one side and a detector 54 which will read out the sample. The reading will then be recorded on a printout 56.

THE PROBES

Figure 4:
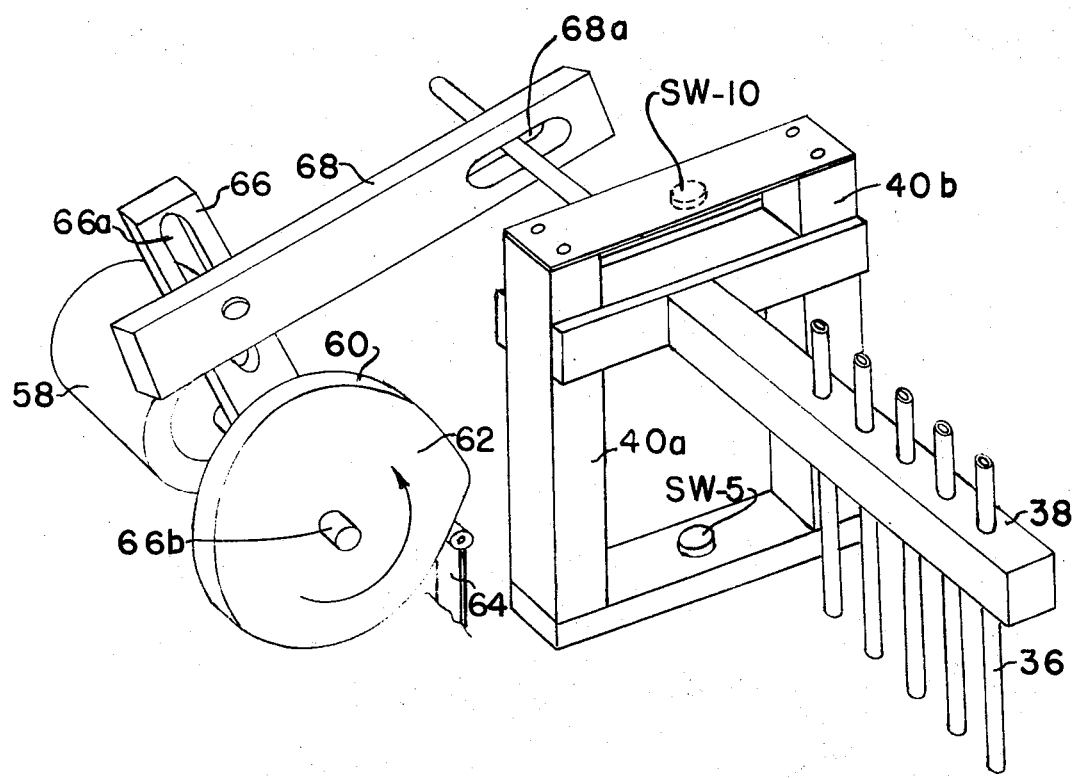
FIG. 4 depicts in perspective one version of some components at the readout station.
Figure 5:
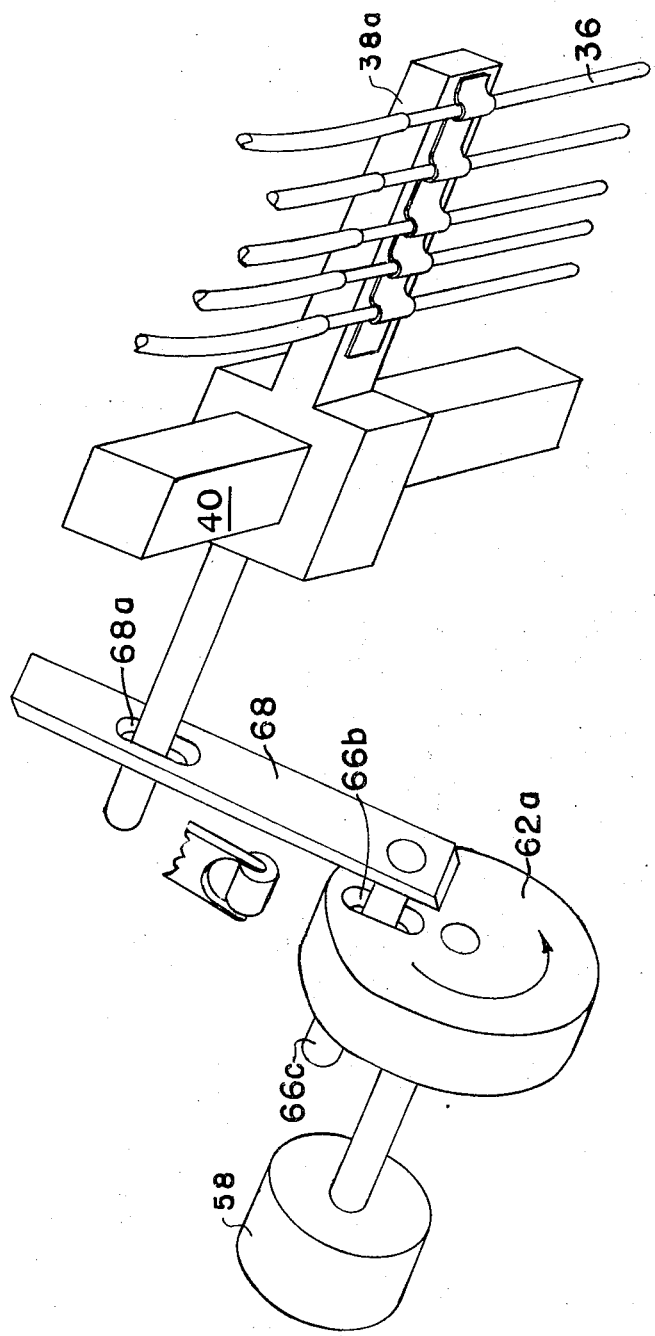
FIG. 5 shows in perspective another version of the components described in FIG. 4.

The movement of the readout probes 36 is down into the test tubes to aspirate the contents and up before the rack is moved forward again. The slide 38 shown in FIG. 4 is T-shaped and is supported on two posts 40a, 40b. Or, the slide may be a collar around one post 40, as shown in FIG. 5. The probes 36 are raised and lowered by a probe motor 58 which also turns a cam 60. It will be noted in FIG. 4 that the cam has a projection 62 to trip certain switches 64 in sequence, as described below. In addition to this cam, several additional cams can be mounted on the same axle, for the purposes of programming various phases of the procedure. This will be described below in describing the sequence of events which take place.

FIG. 4 illustrates the operation of probes at the reading station. The motor 58 turns and raises and lowers a crank arm 66 which is rigidly tied to motor shaft 66b by a keyway. The motor which is a shaded pole motor turns only in one direction and causes the crank arm 66a to move in a circle. The crank arm 66a in turn acts on the lift bar 68 which causes the slide 38 to reciprocate vertically. At the top and bottom of the slide travel path are limit switches, SW-10 and SW-5 respectively, which serve to stop the action of the motor. When these are overridden by a bypass, the probes will move until they come to the opposite switch (SW-5 or SW-10) and stop.

The following action takes place. As the row of test tubes reach the readout station the test tubes trip switch SW-2, see FIG. 2a and FIG. 12. This stops the forward motion of the pusher 24 and halts the five test tubes at the readout station. Crank arm 66 has a slot 66a and lift bar 68 has a similar slot 68a. These permit smooth action in lifting the slide. As the slide 38 reaches the bottom limit switch SW-5, the motor 58 will stop for a preset time period before the limit switch SW-5 is released. This gives the probes sufficient time to aspirate the sample. The probes will then be lifted up by motor 58, crank arm 66 and lift bar 68 until the upper limit switch SW-10 is reached. This will then cause the pusher 24 to again move forward.

A very similar crank and cam arrangement is shown in FIG. 5, where the motor 58 drives a cam 62a with a slot 66b and a crank arm 66c connected to a lift bar 68 with a slot 68a. The slide 38a is formed as a sliding collar on a post 40. The action of the probes is the same as hereinbefore described. While the arrangement in FIG. 5 shows one cam, it is advantageous to achieve the desired objective by using a plurality of cams mounted on the same axle.

It is necessary for the instrument to aspirate the contents of the different solutions in the various rows in the same sequence, for presentation to a readout colorimeter which has a unique design and which will be described in detail later. For the present, referring to FIG. 7a, it will be noted that the colorimeter has a flow through cuvet. A solution aspirated or pushed into this cuvet will intercept a light beam going to the colorimeter. The intensity of the color being observed can thus be measured. For the purpose of this invention it is necessary to guide different solutions into this flow through cuvet in sequence. For this purpose a special sequential valve called a distributor 48 of FIG. 6 is used.

THE DISTRIBUTOR

Figure 6:
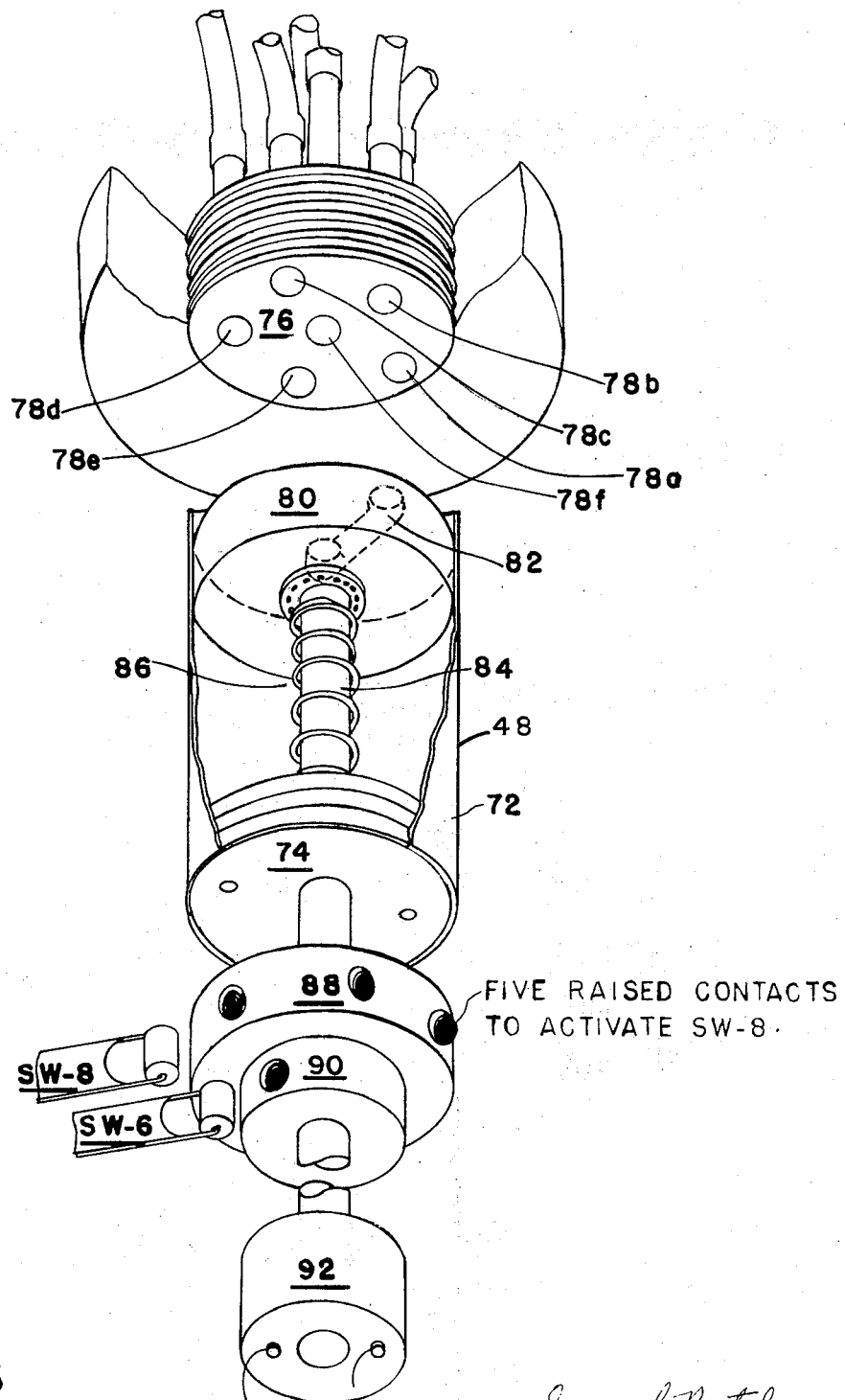
FIG. 6 shows a sample distributor contemplated herein.

Shown in FIG. 6 is a cylindrical vertical chamber 72 with threads at the top and bottom and with first and second end plates which for convenience are illustrated in FIG. 6 as top and bottom plates 74, 76. In the top plate 76 are a plurality of inlets, five being shown for convenience, 78a, 78b .... 78e and a central outlet 78f. Disposed above the bottom stationary plate 74 is a rotary face place 80 with a radial groove 82. Face plate 80 is held concentrically with tip plate 76 by the walls of the cylinder 72. The groove is disposed, with regard to the top stationary plate, with the central opening and the five other openings so that when the face plate 80 is pressed onto the top stationary plate 76 by means of a spring, rotation of the face plate will move the groove so that the center opening marked 78f is connected sequentially with the other openings 78a .... 78e. Bottom plate 74 serves to hold and guide the rod to the motor 92, which activates the face plate 80, thus acting as a bearing.

Each opening 78a .... 78e, which is disposed towards the circumference of the bottom stationary plate is connected by plastic tubing to the probes 36. The central opening is connected by a plastic tubing to the flow through cuvet.

The two plates are made of Teflon or stainless steel. An efficient arrangement is to have the plate with the openings made of stainless steel and the plate with the groove of Teflon. The plates need to be held tightly together. In the version shown in the drawing, the chamber 72 is made from a pipe internally threaded on both ends. The bottom stationary plate is threaded on the outside and screwed into the pipe, as shown in FIG. 6. The face plate 80 with the groove is fixed to an axle 84. A spring 86 is then placed on this axle with washers (not shown) on both sides of the spring. The top plate 76 with a hole in the center is screwed into the top end of the pipe. In this manner, by means of a spanner wrench, the top plate is screwed in until the spring holds the face plate, with the groove, tightly on the stationary plate. This assembly is called the distributor.

Mounted on the axle 84 of the distributor are two wheels 88, 90 with either depressions or mounds to trip switches. The system shown in FIG. 6 shows one wheel 88 called the distributor wheel with five mounds to trip a switch SW-8 five times during one rotation, these mounds line up with the corresponding holes in the stationary plate.

The second wheel 90 on the distributor axle has only one mound. This is located halfway between the mounds on the distributor switch and trips the stop or end cycle switch SW-6. A motor called a distributor motor 92 is attached to the axle of the distributor. As the motor turns, it trips the distributor switch SW-8 five times in one rotation. It also trips the stop cycle switch SW-6 once in one rotation.

Figure 7A:
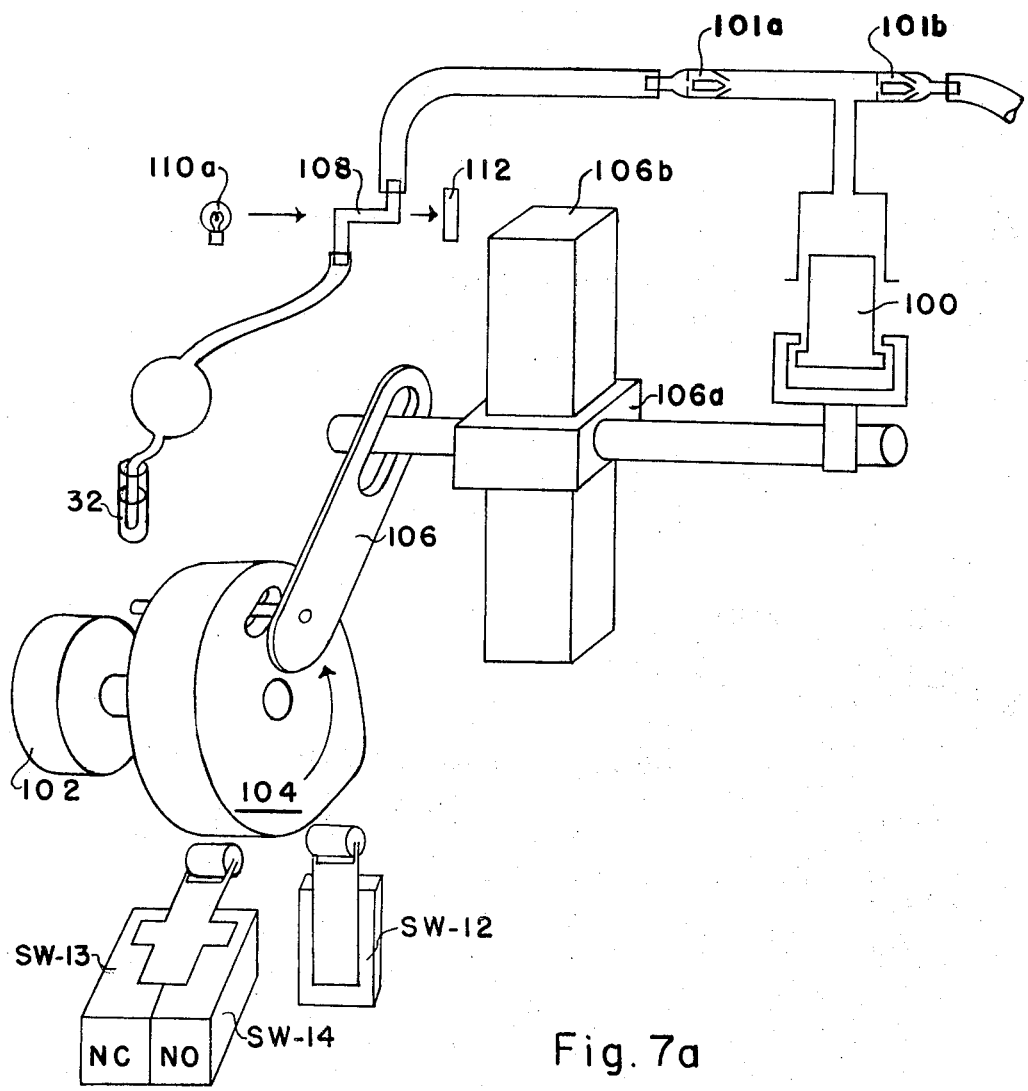
FIG. 7a is another perspective explanation similar to FIG. 7 describing the inventive concept.

FIGS. 7 and 7a depict the action of the aspirator and shown how the samples are sequentially placed in the flow through cuvet. Shown in FIG. 7 are the test tubes 32a, etc., with five probes 36 connected to the distributor tip plate 76 through aperture 78a, etc. and how the face plate 80 with groove 82 connects aperture 78a to center aperture 78f. The sample is moved across the flow cuvet 108 by means of an aspirator 96 which comprises a syringe 98 with piston 100 operated by an aspirator motor 102 connected to a cam 104 and crank arm 106. To obtain precise amounts, it is preferable to have the crank arm 106 move a slide 106a, which in turn slides in a rigid support 106b. This piston 100 is connected to the slide 106a.

This piston 100 moves down when the aspirator motor 102 rotates. This aspirates the sample from test tube 32a probe 36a into hole 78a, through the groove 82 to the center hole 78f of the distributor. The center hole 78f is connected with a hose to the flow through cuvet 108. The sample then goes through the inlet valve of the aspirator, the outlet valve being closed. The travel of the syringe piston 100 is adjustable and is set to a definite volume. A typical volume would be 2 ml. Valves 101a, 101b, regulate the flow.

On one side of the flow through cuvet 108 is a monochromatic light source 110a and opposite the light source is a photocell assembly 112. When the aspirator motor stops, the light through the cuvet records the absorbance of the solution in the flow through cuvet by means of the photocell and printout mechanism. After a preset time, the aspirator motor 102 is activated. This piston moves up to eject the specimen from test tube 32a and then moves down to aspirate the specimen from test tube 32b. This is made feasable because the distributor motor rotates the groove to connect the center aperture with aperture 78b, and thus probe 32b does the sampling. The distributor motor shown in FIG. 6 turns to each position sequentially and finally is stopped by the end cycle switch SW-6 on the distributor. As it turns to each position the aspirator 96 aspirates, and the sample is read by the colorimeter.

Figure 8:
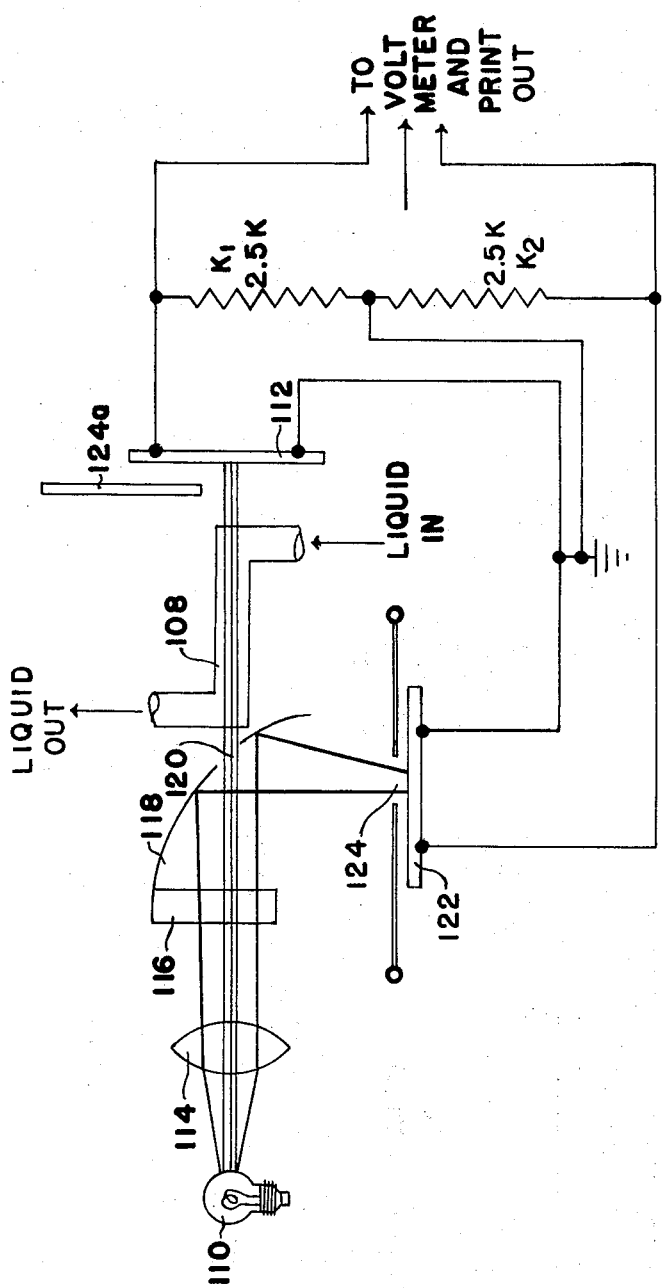
FIG. 8 is a schematic explanation of one embodiment of the readout means contemplated herein.

While FIGS. 7 and 8 show a syringe aspirator, other types of aspirators may also be used. For example, a peristaltic pump, as in FIG. 1a can be programmed to run for a fixed time. The bore of the tubing being used in the peristaltic pump is chosen so as to deliver a preset volume, in a preset time, e.g., 2 ml. The pressure on the tubing by the wheel of the peristaltic pump prevents back siphoning when at rest.

When the stop position is reached, the probes lift, and the test tube rack will be pushed forward one row by the pusher. The rack stops at the next row and the probes move down. The test tubes in the second row are now read out sequentially and the cycle is repeated. This continues until the test tubes in all the rows of the racks have all been read. The rack proceeds now and slides down the ramp slide to be carried away. In the meantime additional racks are added in front of the next pusher to continue additional readings.

THE COLORIMETER

Figure 10:
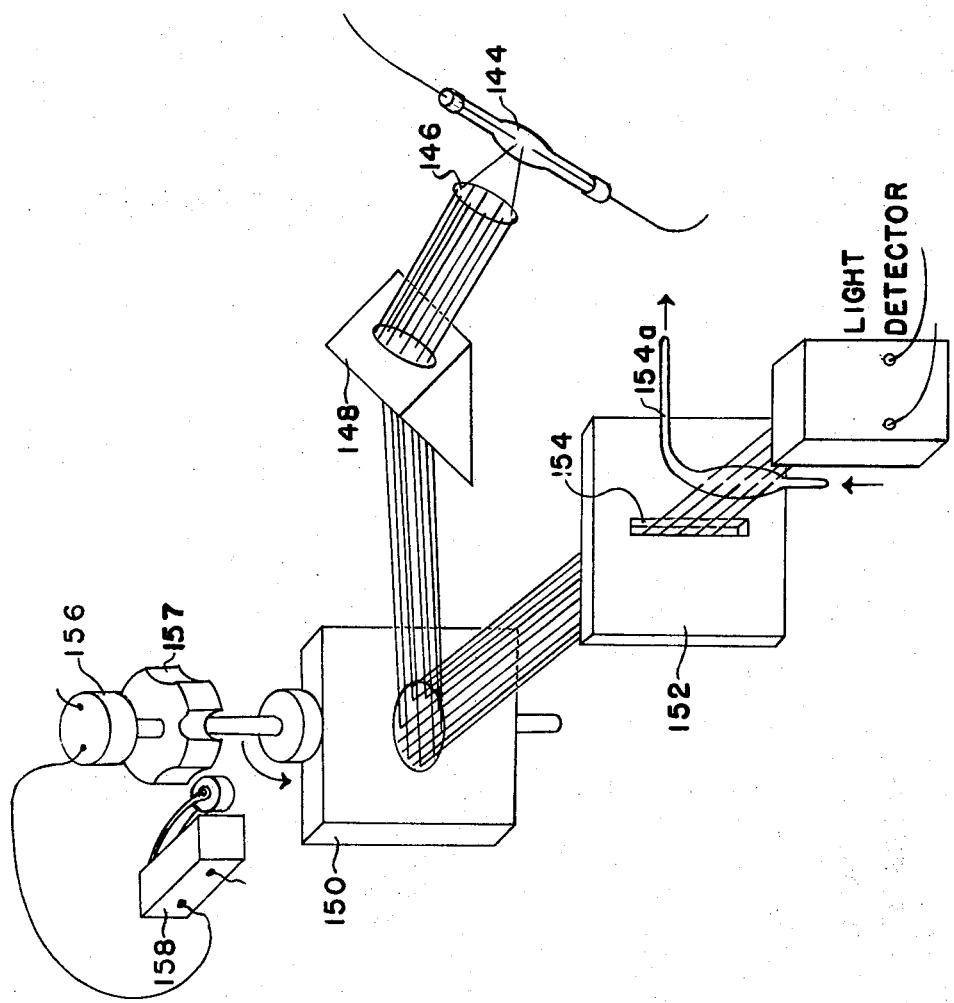
FIG. 10 shows in perspective still another type of readout means contemplated herein.
Figure 11:
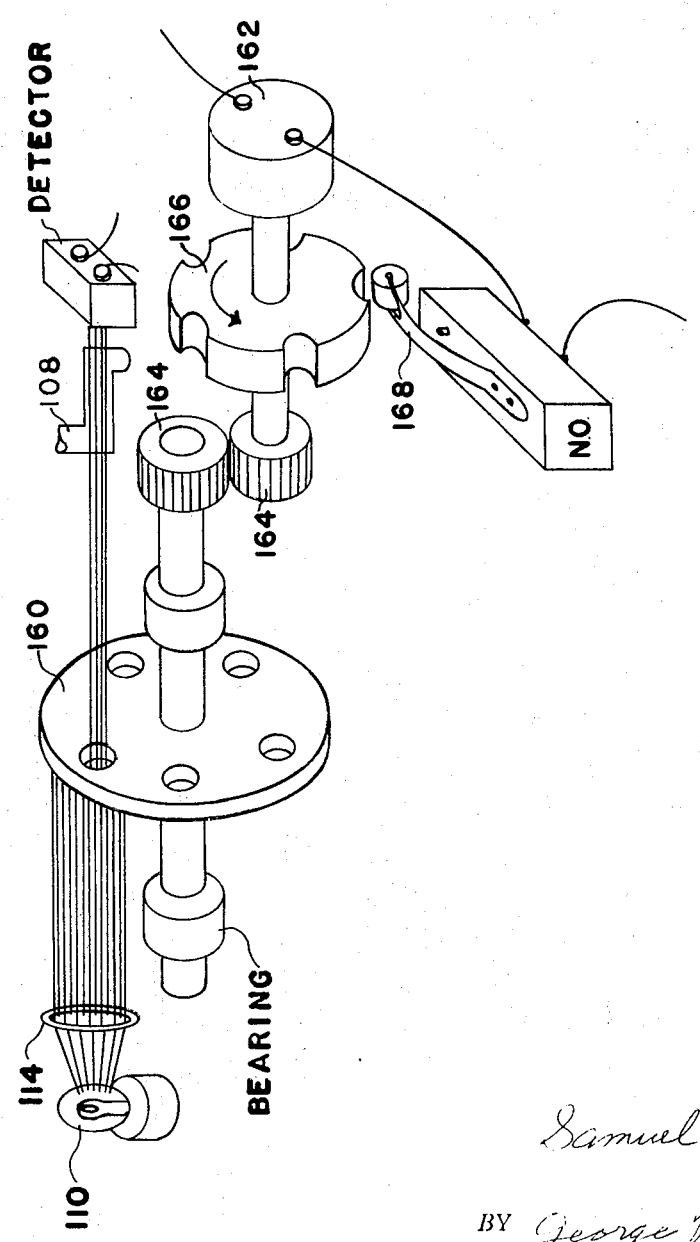
FIG. 11 illustrates in perspective yet another type of readout means contemplated herein.

The operation of the flow through cuvet 108 is illustrated in FIGS. 8, 10, 11. In addition to the lamp 110 on one side and photocell 112 on the other side, the readout includes preferably a quartz convex collimating lens 114 and a light filter 116 in front of lamp 110. The light passes into a curved reflecting mirror 118 with a central aperture 120. The beam is thus split, some light passing from the reflecting mirror 118 into a reference photocell 122, and some through aperture 120 across the flow cuvet 108 to photocell 112. The light which passes through the flow through cuvet 108 needs to be monochromatic light. In its simplest form, this could be a tungsten lamp and filter. In practice, the light source may be a mercury, hydrogen, or xenon light source, if one is to work in the ultraviolet.

The reference cell's output, bucking the readout cell's output, permits precise correction for variation in the intensity of the light source. This can be seen in the circuit showing the reference cell 122 connected to the readout cell across two 2.5K resistors $K_1$ and $K_2$ and where the minus electrode of the reference cell is connected to the minus electrode of the readout photocell. This connection is grounded and connected midway between the two equal resistance values $K_1$ and $K_2$ attached to the corresponding positive poles. The beam of light travels through a small hole in the center of a cylindric mirror. This beam goes through the flow through cuvet and finally reaches the readout photocell.

The main beam is reflected to form a narrow rectangle as it reaches the reference cell. An adjustable slit opening 124 to the reference cell balances the output of the two cells so that the net voltage output to the voltmeter is zero. Thus, the instrument reference voltage is the ground. Variations of the light source will be essentially the same for both cells and thus the system is remarkably stable. Interruption of the light beam through the colorimeter can be sensed and accurately measured by the voltmeter.

An opaque panel 124a is placed so that it can, when it is desired, readily intercept the light beam to the readout photocell. In practice, the instrument is zeroed by adjusting the slit opening to the reference cell. The readout cell is then covered with the opaque panel 124a. The voltmeter adjustment is set to read 100 on the meter. In this way the readout is measured as the percent absorbance. By using the logarithmic voltmeter, the meter can also be made to read directly in absorbance or concentration.

The photocells may be any one of the various types available commercially such as selenium cells, silicon cells, phototubes or photomultiplier tubes. In any case, the same principle applies. Preferably, the selenium cells are used because of their inexpensive nature, stability, and wide wavelength range.

Figure 8A:
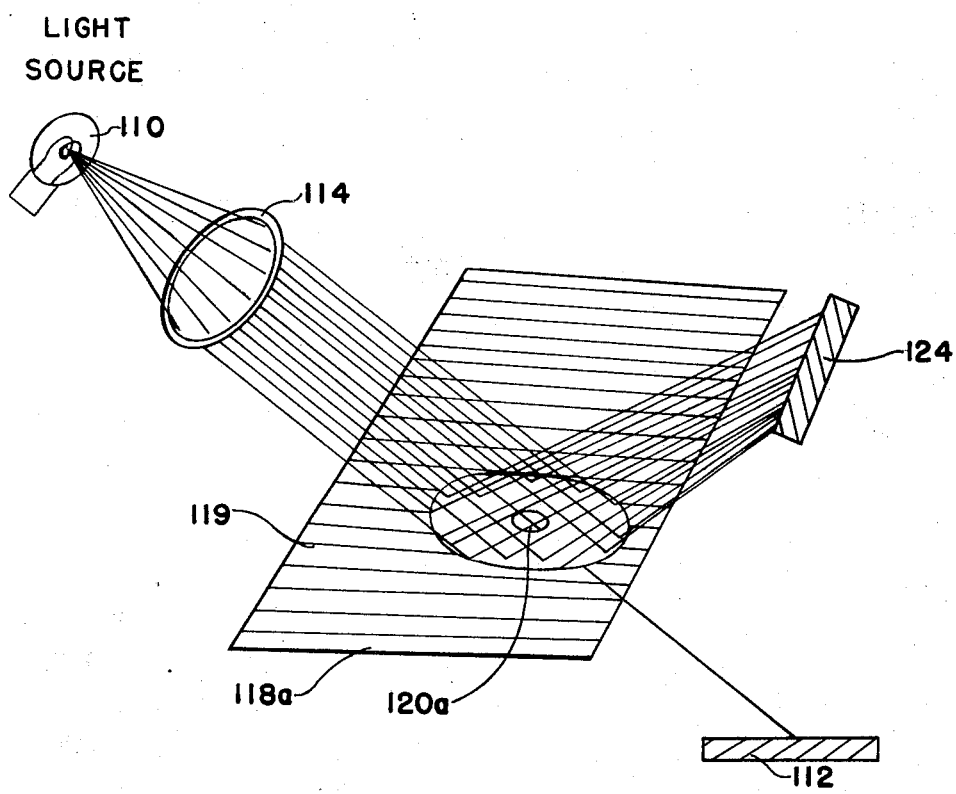
FIG. 8a is a perspective explanation of a scientific principal used herein.

The reflecting mirror is shown as a cylindrical mirror 118 with a hole 120. In actual practice the same effect can be obtained from a flat mirror 118a with certain unique characteristics. Stainless steel and other metals are drawn to form thin sheets. In so doing a series of lines 119 are scored on the metal, in the direction of the draw. The surface therefore consists of a series of rills parallel to each other, in one direction. If a circular beam of light illuminates such a piece of metal, then the reflected light is brought to a line focus, as though it were a cylindrical mirror. This is represented in FIG. 8a. This permits the use of a flat mirror 118a with a hole 120a in place of a curved mirror. Normally, it would be expected that from a flat mirror an image would be formed which would be circular with a dark spot in the center where the mirror had the hole. However, with the stainless steel flat mirror 118a a bar image is formed of essentially uniform intensity so that it can be interrupted in a regular manner to regulate the light falling on the reference cell 124. This is an inexpensive solution to a problem and is a unique way of splitting a light beam.

For the analysis of the elements, such as sodium and potassium, the solution containing these substances is sprayed into a flame. The intensity of the color obtained, e.g., yellow for sodium is a measure of the concentration of the elements. The instrument used is called a flame photometer. By varying the filter of the colorimeter, different elements can be detected such as potassium and lithium. For elements such as calcium and magnesium, a higher temperature for excitation is required and these elements are usually determined by another technique called atomic absorption. By using a hotter flame called a plasma jet, the elements sodium, potassium, lithium, calcium and magnesium, can be determined simultaneously by emission.

The ordinary Neon pilot light will glow when a voltage in excess of 45 volts (90 volts for argon) is reached. This is the voltage required to ionize the gas. The resistance of the gas drops markedly when it is ionized. For this reason, a resistance is usually placed in series with the neon bulb to prevent it from overheating. If this resistance is removed and the current increased until the gas becomes hot, a plasma jet is obtained.

Helium or argon gas is passed over two electrodes in a tube. The voltage is raised to ionize the gas. The gas issues from the tube at temperatures approximately three times that of the Bunsen flame. For laboratory use, jets of very small dimension are available commercially.

If a substance such as diluted serum is injected into this glowing material (called a plasma or plasma jet) the elements can be excited and the emission measured as for flame photometry. The plasma jet has the advantage over the flame because a low background is obtained in that the gases, such as oxygen, nitrogen, carbon dioxide, etc., which are normally present in a flame, are absent. For this reason, higher sensitivity can be attained. Since the plasma jet is "hotter" than the ordinary flame, lines can be excited which require higher energy of excitation.

Figure 9:
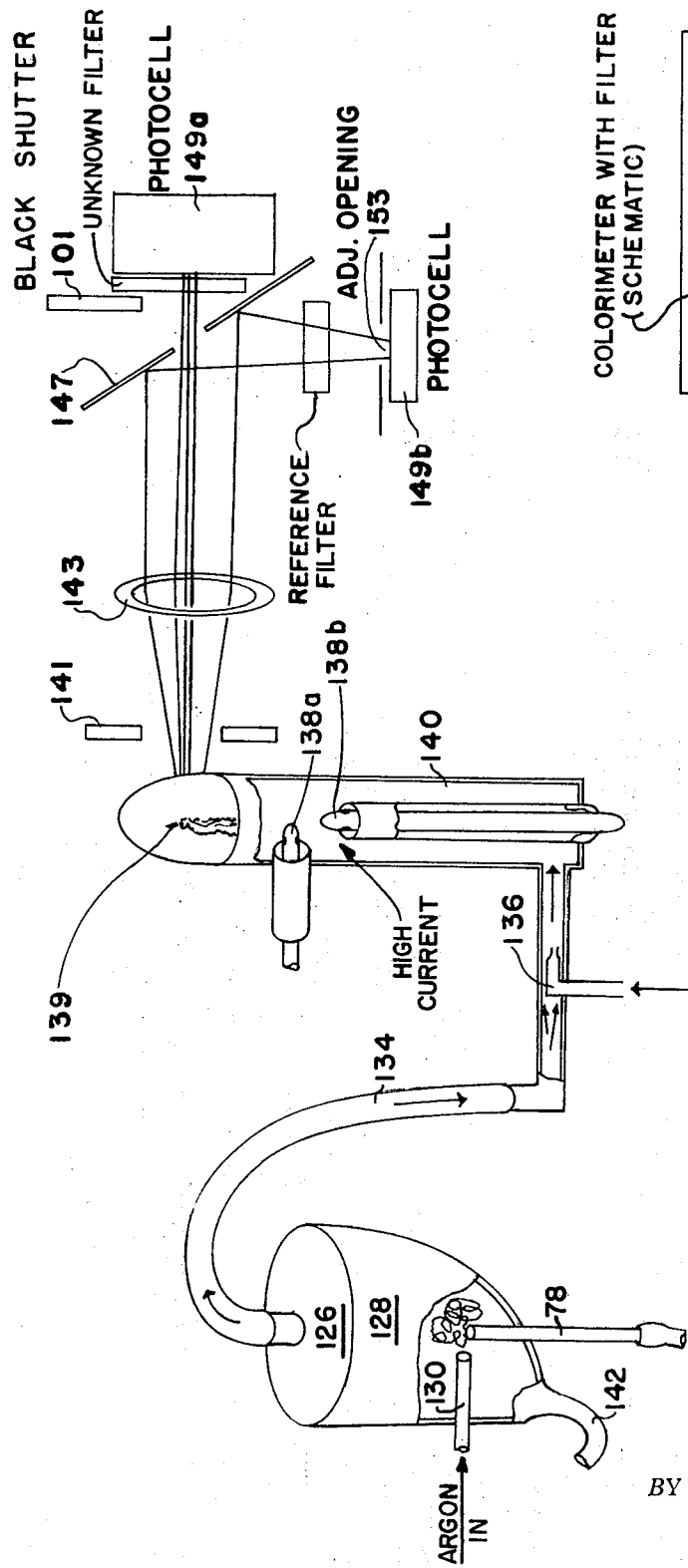
FIG. 9 shows an explanation of another type of readout means contemplated herein.
Figure 9A:
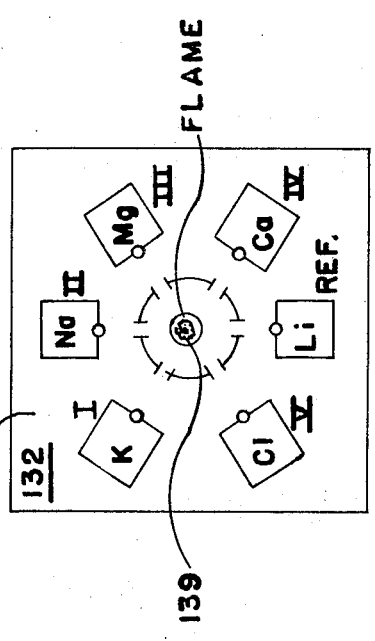
FIG. 9a is a schematic explanation of a portion of the readout means shown in FIG. 9.

The instrument described in this invention can serve as an emission spectrometer using a plasma jet as shown in FIG. 9. In this case, sampling from the tubes is as hereinbefore described, using the rack movement and distributor. However, the distributor exit tube 78' from the center of the distributor 78f is attached to a spray aspirator 126 which has a spray chamber 128 having a narrow gas feed 130 that causes the materiial to vaporize, mix with argon and enter the plasma jet. A multiple readout colorimeter 132 of the type shown in FIG. 9a is disposed around the plasma jet, using the plasma jet as the light source. Each colorimeter has a different light filter so as to read the particular element sought. For example, for magnesium a 283 nm filter is used. For calcium a 424 nm filter is used.

From spray chamber 128, there is an outflow tube 134 connected to the top of the chamber. Additional argon gas is fed to the exit flow path through a narrow tube 136 and the argon-sample mixture is passed between two electrodes 138a, 138b disposed at right angles to each other in an elongated vertical ceramic plasma chimney 140 so that there is a plasma jet flame 139 at the exit of the chamber. In this readout arrangement, the flow-through cuvet is not needed. When argon enters the ceramic tube chimney 140, an arc across the two electrodes ionizes the gas. A high current, e.g., 100 amperes, is passed between the electrodes to heat the argon to a high temperature. The jet of argon glows as it leaves the ceramic tube. Argon gas goes through the narrow gas feed 130 at high pressure and thus at a high velocity. This, by the Bernoulli principle, creates a vacuum about the distributor exit tube 78' connected to the center of the distributor, and this vacuum applies to each test tube sequentially. The liquid which is aspirated forms a spray in the same manner as in a conventional atomizer. Excess moisture drops to the bottom and goes to a drain (not shown). A bend 142 in the tube leading from the waste trap, pools some liquid so as to create a back pressure. The fine mist enters exit flow tube 134 and meets the additional argon coming from narrow tube 136 to the plasma jet. This narrow tube 136 also creates a Bernoulli vacuum to suck in the argon mist. The elements in the jet glow and each gives off their characteristic emission. These are read out on a multiple colorimeter arrangement, each with a different interference filter, equally disposed in a circle around the jet as shown in FIG. 9a. As an alternative, one of the colorimeters may act as an internal standard for the others. For example, if the water, which dilutes the specimen contains a measured amount of lithium, one colorimeter would have a lithium filter. The others would each have a filter for a particular element. The readout would relate each reading to that of the lithium colorimeter. The individual colorimeters do not need a reference cell in this case and their construction is simplified. This is schematically shown in FIG. 9a. Here, five colorimeters, labeled I to V have filters for Na, Mg, Ca, Li, Cl and K. The plasma jet operating in the ceramic chimney 140 is read out by each colorimeter. The readout arrangement is similar to that shown in FIG. 8 and includes a diaphram 141, a lens 143, a filter 145, a reflecting mirror with a hole 147, two photocells 149a, 149b, and a shutter 151 over one photocell with an adjustable opening 153 over the other.

The plasma jet may be replaced by a conventional flame such as a propane-air, acetylene-air, or oxygen, or a hydrogen flame. However, the plasma jet has the advantage of using a non-combustible gas and yields a higher temperature.

While the distributor permits the reading of a plurality of specimens with one colorimeter, it is apparent that if so desired, e.g., when the tubes move 12 abreast it is advantageous to use several colorimeters, each aspirating either directly from a test tube or from groups of test tubes in a row through several distributors. This becomes advantageous when test tubes, moving abreast, each contain a different color as a result of a different procedure. For example, the transfer arrangement described in Pat. application No. 874,824 can be made to add a measured volume of serum and diluent into a container with a plurality of outlets at the base, as has been described above. The end of these outlets is connected to a tubing leading to a peristaltic pump. The peristaltic pump pumps the solution into a test tube held in a rack. Thus the sample is split into several test tubes, held abreast of each other in a rack. Different reagents added to each test tube will result in a different color in each test tube. These can be read out with the distributor coupled to the instruments of FIGS. 10 or 11. Where there are a large number of test tubes in a row, e.g., 12 it is advantageous, to save time, to use more than one colorimeter and more than one distributor. Where several of the test tubes use the same color filter, they may be ganged for reading through a distributor to one colorimeter with a fixed source of monochromatic light.

When doing a variety of tests it is advantageous to use the set up of FIGS. 10 and 11 in place of a multiple colorimeter of distributor arrangement. Since each row contains a plurality of test tubes, each with a different color to be evaluated, each test tube then requires a different source of monochromatic light. This can be avoided by synochronizing the systems shown in FIGS. 10 and 11, so that different wavelengths of monochromatic light can be presented sequentially to each of the test tubes in the row.

Referring to FIG. 10, we see a mercury-xenon light source 144 to generate a broad spectrum of light from the ultraviolet to the near infrared. This light is collimated by a quartz lens 146 to form parallel rays. A prism 148 or diffraction grating now refracts the ray so as to form a spectrum. The spectrum strikes a surface mirror 150 and is reflected onto a piece of metal 152. A narrow slit 154 in the piece of metal permits the selection of a suitable wavelength of the spectrum for the particular test. This is done by rotating the flat surface reflecting mirror until the desired wavelength is at the slit, thus passing through and reaching the light detector. Interposed between the slit and the light detector is a flow through cuvet 154a to intercept the monochromatic light so as to measure the absorbance of the light.

The mirror 150 is operated by a mirror motor 156 which rotates the mirror on an axle. On the same axle is mounted a cam 157 with multiple depressions equal to the number of test tubes in a row. As the distributor turns to aspirate the contents of each test tube, a mirror stop switch 158 is momentarily bypassed, activating the motor. The mirror turns until the switch 158, which is normally open, reaches a depression. The switch goes to its normal position stopping the motor, the mirror stopping rotation at a point for the correct wavelength for that test tube. As each test tube is read the mirror rotates slightly. When the last tube has been read the mirror rotates to complete a circle of 360° so that it is in position to read the first test tube in the next row. Thus, the contents of each test tube may be read out at a different wavelength using one colorimeter.

An alternative system, using the same principle, but using interference filters is shown in FIG. 11. In this case, a wheel 160, holding several interference filters is mounted on an axle, supported by bearings. This is made to rotate by a motor 162 through a pair of gears 164. Rotating at the same time is a cam 166 with as many depressions as there are test tubes and interference filters. The distributor supplies a momentary bypass to the filter wheel motor causing the motor to turn. The filter wheel stop switch 168 (normally open) stops the motor 162 at the next notch in the cam. Thus, a different interference filter may be present for each test tube in the row. For the next row the process is repeated. Thus, test tubes in back of each other (the different files) are read with the same filter. Test tubes in different files may be read with the same or different filters.

THE ELECTRICAL CIRCUITRY

Figure 12:
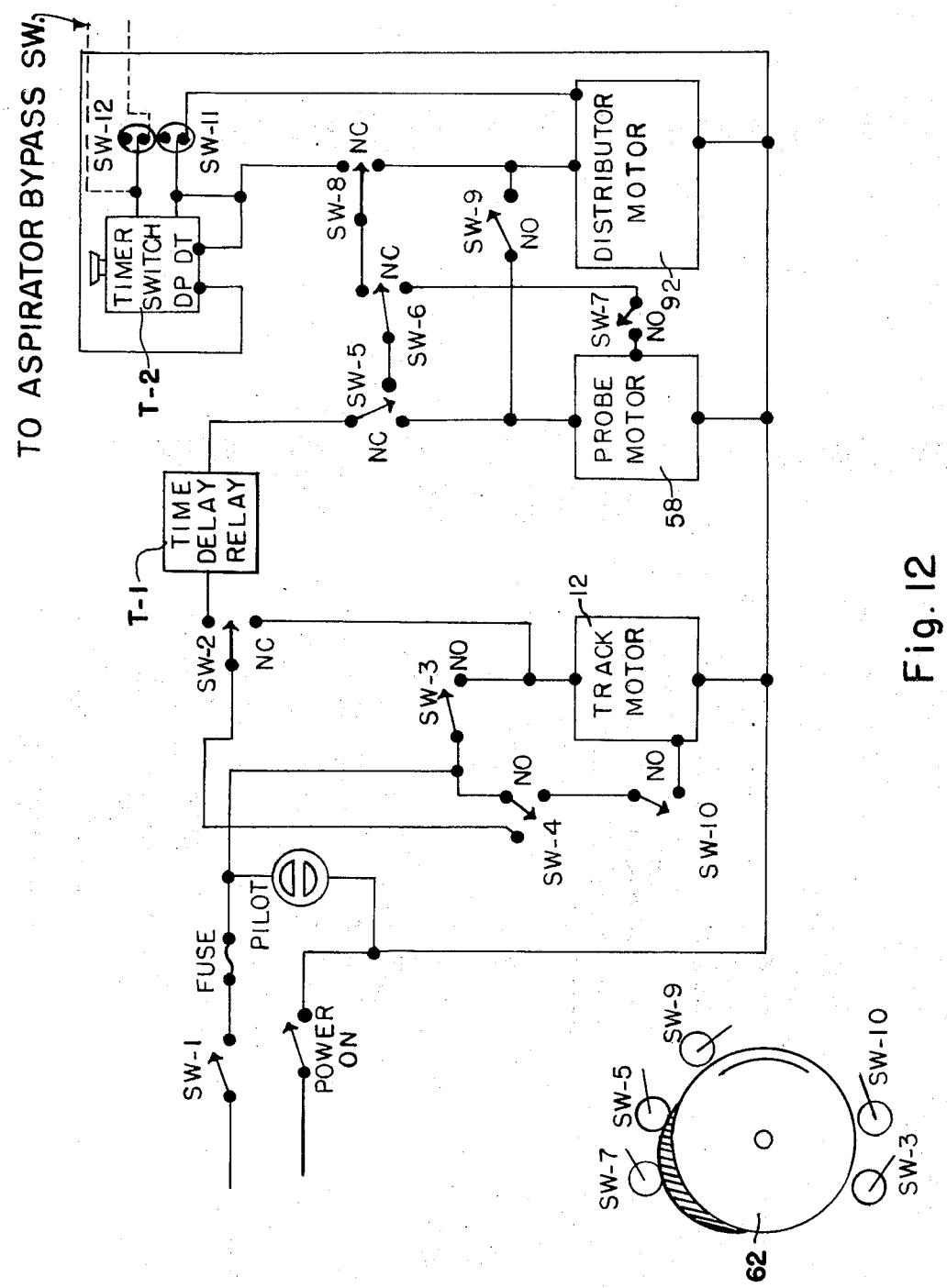
FIG. 12 is an electric schematic diagram of circuitry used herein.

Shown in FIG. 12 are three motors used in the system, namely, the track motor 12, the probe motor 58, and the distributor motor 92. Each motor is operated by one or more switches and the switches in turn are operated by a cam. The switches in the drawing are labeled NO (Normally Open), and NC (Normally Closed).

The switches are as follows:
SW-1: switch to turn the power on and start the operation of the entire instrument.
SW-2: switch which will be pressed by first and succeeding test tubes at the readout position. This causes the probes to be lowered.
SW-3: momentary bypass switch.
SW-4: track override switch which will permit the operator to move the test tube rack to any desired position.
SW-5: switch to stop the downward travel of the probes at the lowest point required.
SW-6: end cycle switch of the distributor.
SW-7: down bypass switch.
SW-8: distributor switch.
SW-9: momentary end cycle by-pass switch.
SW-10: top bypass switch.
SW-11: distributor bypass switch.

The track motor 12 needs the following switches: SW-10, the top position switch which is closed when the probes are in the up position, SW-4 in series with SW-10, which is the track override switch. Thus, the track override switch will not close the circuit unless the probes are in the up position. This prevents forward movement while the probes are down in the test tubes. SW-3 will momentarily permit the track to go forward to the next position. This serves to override SW-2, the test tube switch and start the motion to the next row.

The probe motor 58 uses several switches, SW-2, time relay T-1, SW-5 and SW-7.

The distributor motor 92 uses switches SW-8 and SW-9 and momentary bypass SW-11 which starts it rotating to the next position.

Figure 12A:
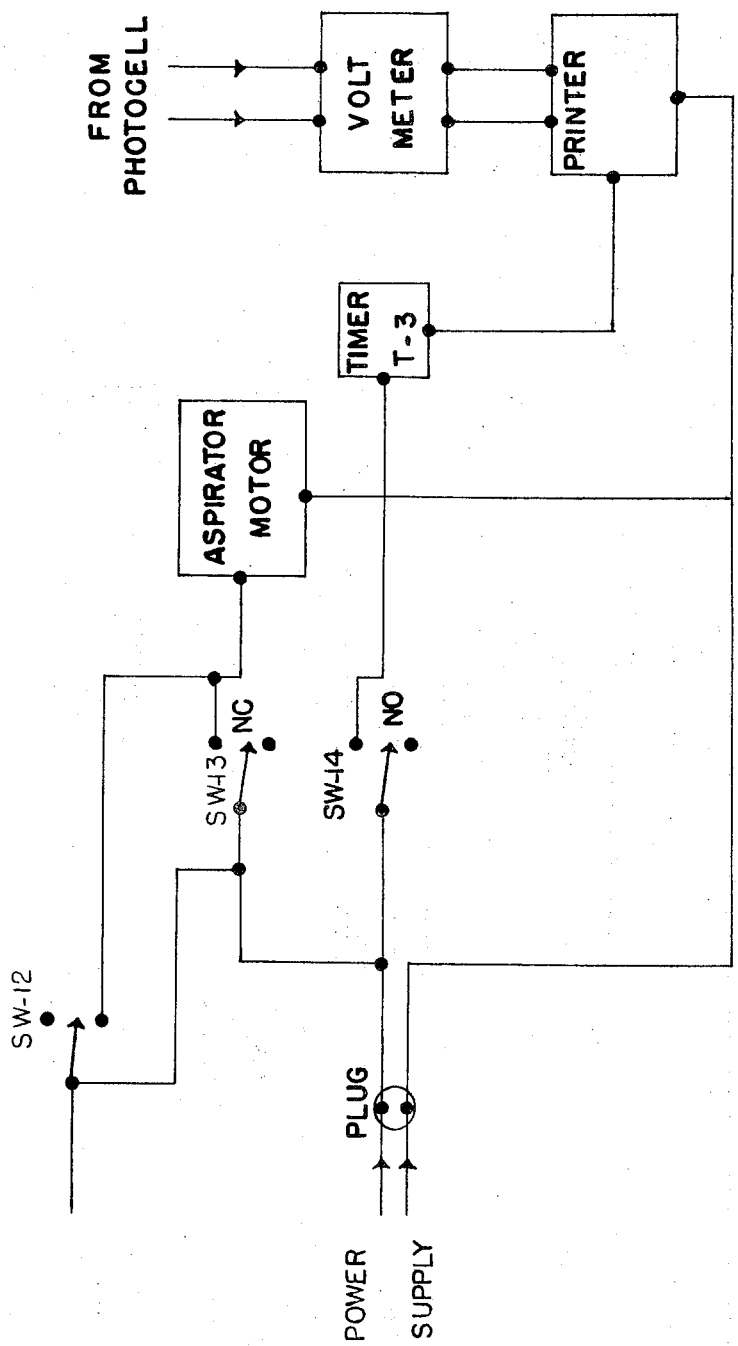
FIG. 12a is another electric schematic diagram of circuitry used herein.

The detail of the systems electrical operation can be seen from FIGS. 12 and 12a. For simplicity, this will be broken up into two phases. First, the operation of the test tube rack in feeding the colorimeter and second, the readout. In order to understand this electrical operation, it is also necessary to examine the switch positions on the lift cam 62. For ease of explanation, it will be noted that five switches are located around this cam, SW-3, -5, -7, -9, -10. In practice, it is preferable to mount three additional similar cams on the same axle. The first and second cams would be in the same position, one tripping SW-7 and the other tripping SW-5 at the same time. A third would trip SW-9 and a fourth would trip SW-3. This permits the easy adjustment of the time when SW-9 and SW-3 would be tripped. This is so because it is easier to rotate the cam than to move the switch. SW-10, being alone would be placed at 180° from SW-7, over the same cam.

The sequence of operation is as follows:
1. The operator turns on power switch on SW-1.
2. The operator loads the track with a test tube rack full of test tubes. He activates track override switch SW-4 to bring the rack to a first desired test tube position where the first test tube trips test tube switch SW-2. The operator releases track override switch SW-4, and this returns to its original position since it is spring loaded. Top switch SW-10 is in series with SW-4. Therefore, the probes must be at the top position when the SW-4 override switch is activated.
3. Test tube switch SW-2 is now in the open position to contact a time delay relay T-1. This delays momentarily (one-half second) before the probes are lowered into the test tubes. This may be omitted. For some applications a reagent is added before the probes descend. In this case the time delay relay is advantageous.
4. The probe motor is now activated. The probes are lowered until the cam reaches bottom switch SW-5 causing it to stop. On its way down, before it opens SW-5 it trips SW-9 (the momentary end cycle bypass) long enough to cause the distributor motor to start. This pulls switch SW-6 off the end cycle button putting switch SW-6 in the closed position. Now when the probe dive is completed, the cam will open SW-5, thus feeding current through the now closed end cycle switch.
5. At this point, SW-9 is open and current reaches the distributor motor through distributor switch SW-8. Distributor motor 92 turns until one of the 5 knobs of the distributor cam (see FIG. 6) trip distributor switch SW-8. This opens SW-8 and connects the line to a switch and time T-2. The timer runs for a prefixed time and then closes distributor bypass switch SW-11. This causes the distributor to move to the next knob, opening the distributor switch SW-8, which stops the rotation at that point. Time delay switch T-2 is now reactivated and the cycle is repeated.
6. This continues until end cycle switch SW-6 reaches the end cycle cam knob, closing the SW-6 end cycle switch.
7. This cuts off current to the points beyond this switch.
8. After the probes were lowered and stopped, the down bypass switch SW-7 was closed. However, no current could flow to this switch because SW-6, the end cycle switch, was in the open position. Now that the end cycle switch is in the closed position the probe motor is activated causing the probes to rise. This opens SW-7 and closes SW-5.
9. Cam rises and trips momentary bypass switch, SW-3, which starts the track motor. This pulls the tube off test tube switch SW-2 closing said switch. In the meantime, switch SW-3 has been passed by the lift cam and is in the open position so that the track motor cannot get any power from this source. Power travels now only through SW-2 in the closed position. When this hits the next test tube, it opens and the cycle repeats itself.

ASPIRATION READOUT AND PRINTOUT

It will be noted that aspirator bypass switch SW-12 is closed for a short period of time during which a bypass from SW-11 is provided to the distributor motor 92. This is a double pole, double throw (DPDT) switch. The SW-12 leg of the switch is used to close a circuit providing a bypass to the aspirator motor 102 shown in FIG. 7. It can be seen from FIG. 7a that the aspirator cam 104 opens the normally closed aspirator cam switch SW-13. A bypass SW-12 provided for this switch will activate aspirator motor 102. The aspirator cam switch SW-13 will then slip off the lift of the cam and be closed. The aspirator motor 102 continues to run until it completes a 360° turn. The aspirator cam 104 then opens the aspirator cam switch SW-13, the motor stopping. Since the bypass SW-13 provided by aspirator bypass switch is only temporary and has ceased, a pause occurs as the aspirator motor stops.

When the aspirator motor stops, a second switch, SW-14, tied to the aspirator cam switch, but not connected to it, is activated. This is shown in FIGS. 7a and 12a. From FIG. 12a closing the NO switch SW-14 will activate timer switch T-3. This operation is done by using a second switch (one of the double switches) which is normally open but closes when depressed by the aspirator cam. This has the advantage that a separate power circuit, 102a, not necessarily in phase with the main circuit, may be used at this point.

Timer switch T-3 is activated while the aspirator motor rests. This permits adequate time for the voltmeter to read the voltage generated by the colorimeter. At this point, after 4 seconds, the timer switch, T-3, closes activating the printer to record the reading. When aspirator bypass switch is activated again by timer switch T-2, the cycle is repeated.

FIG. 12a is a continuation of FIG. 12.

A source of current, independent of the current supply operating the drive motor is supplied in FIG. 12a. It is to be noted that the time switch T-2 of FIG. 12 closes a circuit which is labelled "to aspirator bypass switch." This causes the aspirator to aspirate a measured sample through the flow through cuvet. Since this switch is closed, each time the distributor rotates to allow the flow through cell to communciate with the next test tube in the row, the contents of each test tube will be aspirated through the flow through cell and be printed out as a number. The circuit of this aspirator system is shown in FIG. 12a.

In FIG. 7a, the cam, activated by a motor, causes the plunger of the syringe to move up, expelling the liquid contained therein, and down to aspirate the sample and filling the cuvet. This syringe is set to a fixed volume, e.g., 2 ml to aspirate a volume adequate to rinse the cuvet of a previous sample and fill it with a new sample. After completing a cycle, the cam activates the double pole, double throw switch SW-13 and SW-14. No current can now get to the aspirator motor since SW-13 has been opened. The aspirator stops in the down position.

When SW-13 is shorted for a short period of time by aspirator bypass switch, the aspirator motor starts and runs long enough to release SW-13 to its normally closed position supplying current to the motor. The aspirator motor runs until it completes a cycle, depresses SW-13 and then stops. Since SW-14 is also depressed at this time, printer timer switch T-3 is activated. After a short delay, the printer prints out the result sensed by the voltmeter.

For the purpose of giving those skilled in the art a better understanding of the invention, the following illustrative example is given.

EXAMPLE

In order to understand the workings of the instrument, a typical example of its use will be described.

The transfer machine described in Natelson, application Ser. No. 95,305 is used in conjunction with the present invention.

The transfer machine samples 50 μl of human serum and ejects it into the cup of FIG. 1d, with a volume of 8 ml of 0.1 M phosphate buffer pH 7.4. The tubing of FIG. 1d is set to deliver 1.5 ml from this cup when the peristaltic pump 31, runs 6 seconds. At the same time, it samples 1.5 ml of reagent from each of five containers, 43a ... e, respectively. The reagents in each of the containers contain 45 μm/liter of DPNH, dissolved in the following reagents.

43 a. Buffer - this serves as the serum blank.

43 b. 1 mM pyruvate in buffer. This will do the lactic dehydrogenase test, (LDH).

43 c. mM alanine and 1 mM ketoglutrate plus lactic dehydrogenase plus buffer. This will do serum glutamate - pyruvate transaminase test, (SGPT).

43 d. 5 mM aspartic acid, 1 mM ketoglutarate plus malic dehydrogenase plus buffer. This will do the serum glutamate - oxalacetate transaminase test, (SGOT).

43 e. 5 mM phospho-enol-pyruvate, 0.1 mM ATP, pyruvate kinase, lactic dehydrogenase, 0.1 mM glutathione, plus buffer. This will do the creatine - phospho kinase test (CPK).

In each case the DPNH will be destroyed and its disappearance will be measured in a fluorometer. DPNH fluoresces when excited at 340 μm. This disappers as it is converted to DPN.

The sequence of events which occurs after a row of test tubes moves into receiving position is as follows:

1. The sample diluted with 8 ml of buffer is deposited in the cup, 27.
2. The reagent probes 41a, 41b, etc. descend.
3. Peristaltic pump 31 operates for 6 seconds removing 1.5 ml of each reagent and 1.5 ml of diluted specimen from the cup.
4. Reagent probes rise as peristaltic pump 33 empties cup 27 of unused liquid. Thus, 1.5 ml, but no more, of reagent is added.
5. A syringe pump (not shown) now pours 8 ml of buffer into cup 27 for rinsing.
6. Peristaltic pump 31 is reactivated for 6 seconds taking 1.5 ml, in each sample tube, of diluting buffer pH 7.4.
7. Peristaltic pump 33 ejects excess of diluting buffer.
8. Peristaltic pump is reactivated and pumps for 12 seconds cleaning all tubing and emptying the contents into a row of test tubes.
9. The rack in FIG. 1e advances one row and the process is repeated using a second serum sample. Since there are 16 rows and each cycle takes 30 seconds, the rack is cleared in 8 minutes. During this time, the reaction is proceeding in each tube.
10. The rack is transferred to the second driving mechanism, see FIGS. 1a, 1b, 1c and 1e, and proceeds to the readout station.
11. Each specimen in a row is aspirated, in sequence, by the aspirator pump and the distributor, into a fluorometer and the results are printed out on the printout device, correction being made for the blank. The results will then be reported for LDH, SGOT, SGPT and CPK, for each serum.

Note that each specimen generates five tubes. Thus, each rack of test tubes generates five racks. In the instrument, one loads a rack with empty tubes to move to position SW-2A. One then places a rack behind it. When the first rack has moved on to the second driving mechanism, a third rack is added. Thus, the instrument holds three racks simultaneously. Two additional racks are added after two have been assayed.

It is also practicable to make the first driving mechanism longer to hold all five racks if one desires.

I claim:

1. In an automated system of chemical analysis, an instrument for the assay of components in a solution which comprises in combination:
   a. means for presenting rows of containers sequentially to a readout station having probes thereat;
   b. means for lowering said probes into said containers;
   c. a distributor operatively connected to each of said probes, connecting sequentially each container to an aspirator so that each sample may, in turn, be aspirated into and assayed by readout means, said distributor including first and second plates each with a flat side, said first plate being stationary and having a central opening and several peripheral openings, said second plate containing communication means for communicating between said central opening and peripheral openings, holding means holding said plates in engagement and, sequential rotating means for sequentially rotating said second plate so that said communication means sequentially connects each of said peripheral openings to the central opening; and,
   d. readout means along the path of travel of said sample.

2. A system as claimed in claim 1, wherein said readout means includes:
   a. a light source;
   b. collimating means in the vicinity of said light source to produce parallel light beams;
   c. means for forming monochromatic light from said beams;
   d. beam splitting means for splitting said light beams along two paths;
   e. a flow through cuvet along one of said paths;
   f. a readout light sensitive cell including a cell output side downstream of said flow through cuvet along said one path and a reference light sensitive cell including a cell output side along said other path; and,
   g. balancing means for adjusting the intensity of the reference cell so that the output side of the reference cell and readout cell balance when said flow through cuvet contains a blank solution.

3. A system as claimed in claim 1, including filter means for forming monochromatic light in said readout means, and, changing means for changing said filters for each sequential connection of said sequential connecting means.

4. A system as claimed in claim 1, wherein said readout means includes:
   a. a light source;
   b. collimating means in the vicinity of said light source to produce parallel light beams;
   c. means for forming monochromatic light from said beams;
   d. beam splitting means for splitting said light beams along two paths;
   e. a flow through cuvet along one of said paths;
   f. a readout light sensitive cell including a cell output side downstream of said flow through cuvet along said one path and a reference light sensitive cell including a cell output side along said other path; and,
   g. balancing means for adjusting the intensity of the reference cell so that the output side of the reference cell and readout cell balance when said flow through cuvet contains a blank solution.

5. A system as claimed in claim 4, wherein said beam splitting means is a flat drawn metal with striations in one direction, said plate having a small hole in the center and being disposed at right angles to the broad incident beam, the striations being parallel to one plane so that a narrow rectangular image of the beam will be formed in another plane at right angles to the one plane, said balancing means including a mask placed in the path of said image to intercept the beam image and control the amount of beam reaching the reference cell.

6. In a system of chemical analysis wherein parallel rows of sample holding containers are stopped at a work station (34) with said containers occupying at least two lateral defined places, a processing arrangement comprising:
   a. a plurality of probes (36) disposed for vertical movement above said work station (34) with lower ends, said lower end entering said containers (32) on the downward vertical movement of said probes;
   b. a distributor (48) connected to each of said probes (36) an outlet (78f) from said distributor, sequential connecting means in said distributor (48) sequentially connecting said probes to said outlet, said distributor including first and second plates, each with a flat side, said first plate being stationary and having a central opening and several peripheral openings, said second plate containing communication means for communicating between said central opening and each of said peripheral openings, holding means holding said plates in engagement and, sequential rotating means for sequentially rotating said second plate so that said communication means sequentially connects each of said peripheral openings to the central opening;
   c. utilization means (108, 110, 112) for utilizing material sequentially provided by said outlet; and,
   d. pump means (98) connected with said probes to pump samples touched by said probes through the distributor and utilization means.

7. A system as claimed in claim 6, said distributor including motor means including a motor switch for rotating said second plate to sequentially connect said central opening with each of said peripherial openings; cam pause means engaging said motor switch causing said communication means to pause at each peripheral opening; cam stop means engaging said motor switch causing said communication means to stop in a position intermediate said first and last peripheral opening after said communication means has sequentially connected every peripheral opening with said central opening.

8. In a system of chemical analysis wherein parallel rows of sample holding containers (32) are stopped at a specimen readout station (34) with said containers occupying at least two lateral defined places, a processing arrangement comprising:
   a. a plurality of probes (36) disposed for vertical movement above said station (34) with lower ends, said lower end entering said containers (32) on the downward vertical movement of said probes;
   b. a distributor (48) with connecting lines (44) connected to each of said probes (36), a central outlet (78f) from said distributor, sequential connecting means in said distributor (48) sequentially connecting separately each of said connecting lines to said central outlet, said distributor including: first and second plates, each with a flat side, said first plate being stationary and having a central opening and several peripheral openings, said second plate containing communication means for communicating between said central opening and each of said peripheral openings, holding means holding said plates in engagement and sequential rotating means for sequentially rotating said second plate so that said communication means sequentially connects each of said peripheral openings to the central opening;
   c. readout means (108, 110, 112) connected to said central outlet;
   d. pump means (98) in series with said probes to pump samples touched by said probes through the distributor and readout means; and,
   e. power means to sequentially present said containers to said readout station, lower and raise said probes at said station, operate said sequential connecting means and operate said pump means.

9. A system as claimed in claim 8, including:
   a. a defined track of adjustable width for a rack to move therealong to a terminal station, with containers therein;
   b. a pusher on said track to move a rack therealong including moving means to move said pusher;
   c. a defined reading station before said terminal station along said track including stop means thereat in the path of said containers to stop said moving means for a predetermined time period when contacted by a test tube in a rack traveling along said track; and,
   d. a terminal station, including carry away means to carry away said racks after the containers are processed by said processing arrangement.

10. A system as claimed in claim 8, including a sample feeding station prior to said readout station comprising:
   a. a splitter container having outlets at the base of said splitter container including at least one excess outlet in addition to the lateral number of defined spaces, delivering means to deliver a row sample fluid to said splitter container;
   b. a first set of flexible tubes, one tube being sealed to each of said outlets, a second set of flexible tubes connected to probe elements at one end, said probe elements and said second set of flexible tubes corresponding in number to said lateral defined spaces, connectors for joining the flexible tubes in said second set with a like number of tubes in said first set;

c. lift means to raise and lower said probe elements into reagents;

d. pump means acting on said first and second set of tubes to pump raw liquid sample and reagent to said connectors to form test samples and to pump out excess sample through said at least one excess outlet; and, e. a loading station at said connectors location and connector outlets on each of said connectors to emit a sample in each of said test tubes.

11. A system as claimed in claim 8, wherein said power means includes probe lifting means comprising:

a. at least one vertically disposed slide rod;

b. an appendage attached to said slide rod holding said probes;

c. motor means connected to said appendage for raising and lowering said appendage; and, d. cam means connected to said motor and switch means enabled by said cam means sensing the position of said appendage along said slide rod.

12. A system as claimed in claim 8, wherein said readout means includes:

a. a light source;

b. collimating means in the vicinity of said light source to produce parallel light beams;

c. means for forming monochromatic light from said beams;

d. beam splitting means for splitting said light beams along two paths;

e. a flow through cuvet along one of said paths;

f. a readout light sensitive cell including a cell output side downstream of said flow through cuvet along said one path and a reference light sensitive cell including a cell output side along said other path; and, g. balancing means for adjusting the intensity of the reference cell so that the output side of the reference cell and readout cell balance when said flow through cuvet contains a blank solution.

13. A system as claimed in claim 12, wherein said beam splitting means is a flat drawn metal with striations in one direction, said plate having a small hole in the center and being disposed at right angles to the broad incident beam, the striations being parallel to one plane so that a narrow rectangular image of the beam will be formed in another plane at right angles to the one plane, said balancing means including a mask placed in the path of said image to intercept the beam image and control the amount of beam reaching the reference cell.

14. A system as claimed in claim 8, said pump means comprising a syringe including a piston disposed between an inlet and outlet valve, lift means connected to said piston to raise and lower said piston, said lift means a unidirectional motor activating with a motor axle, an aspirator cam and switch assembly mounted concentrically on said axle so that a measured amount of a solution held in said containers can be drawn through a flow through cuvet causing said piston pausing during the readout, said piston then continuing its motion to expel the contents and aspirate a second sample through the flow through cuvet, the motion of the piston being programmed by said aspirator cam and switch assembly.

* * * * *